US012632433B2

(12) United States Patent
Yao et al.

(10) Patent No.: US 12,632,433 B2
(45) Date of Patent: May 19, 2026

(54) MODEL TRAINING SYSTEM, MODEL TRAINING METHOD, TRAINING DEVICE, AND TRAINING NODE

(71) Applicant: HUAWEI TECHNOLOGIES CO., LTD., Shenzhen (CN)

(72) Inventors: Yifan Yao, Shenzhen (CN); Teng Su, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/962,302

(22) Filed: Nov. 27, 2024

(65) Prior Publication Data

US 2025/0094397 A1     Mar. 20, 2025

Related U.S. Application Data

(63) Continuation of application No. PCT/CN2022/095998, filed on May 30, 2022.

(51) Int. Cl.
G06N 20/00         (2019.01)
G06F 16/00         (2019.01)
(Continued)

(52) U.S. Cl.
CPC ........ G06F 16/2228 (2019.01); G06F 16/245 (2019.01); G06F 16/2465 (2019.01);
(Continued)

(58) Field of Classification Search
CPC ............. G06F 16/2228; G06F 16/9024; G06F 16/2465; G06F 16/245; G06N 20/00;
(Continued)

(56) References Cited

U.S. PATENT DOCUMENTS 11,809,863 B2 * 11/2023 Story ..................... G06N 20/00
11,853,401 B1 * 12/2023 Nookula ............. G06F 18/2163
(Continued)

FOREIGN PATENT DOCUMENTS

WO     WO 2018153806 A1 * 8/2018
WO     WO 2021119601 A1 * 6/2021

OTHER PUBLICATIONS

Tayfun Gokmen et al., "Algorithm for Training Neural Networks on Resistive Device Arrays", Neuromorphic Engineering,vol. 14—2020, Feb. 2020, pp. 1-16.*

(Continued)

*Primary Examiner* — Srirama Channavajjala

(57)          ABSTRACT

The present invention provides a model training system, a model training method, a training device, and a training node. The system includes: n training devices, in which a total of M training nodes are deployed. Each training device stores a global index list and a dataset corresponding to a training node deployed in the training device, and the global index list indicates indexes of data in datasets respectively corresponding to the M training nodes. Each training device is configured to: shuffle the global index list by using a random number seed, and query, based on a shuffled list, the dataset stored in the training device, to obtain exchange data of the training node deployed in the training device, where the exchange data is hit data obtained through data query.

18 Claims, 14 Drawing Sheets

(51) Int. Cl.
  *G06F 16/22* (2019.01)
  *G06F 16/245* (2019.01)
  *G06F 16/2458* (2019.01)
  *G06F 16/901* (2019.01)
  *G06N 20/10* (2019.01)

(52) U.S. Cl.
  CPC ......... *G06F 16/9024* (2019.01); *G06N 20/00* (2019.01); *G06N 20/10* (2019.01)

(58) Field of Classification Search
  CPC ........... G06N 20/10; G06N 3/04; G06N 3/98; G06N 3/045; G06N 3/105
  See application file for complete search history.

(56) References Cited

U.S. PATENT DOCUMENTS

| | | | | |
|---|---|---|---|---|
| 2015/0324690 | A1* | 11/2015 | Chilimbi | ............... G06N 3/063 706/27 |
| 2017/0220949 | A1* | 8/2017 | Feng | ...................... H04L 41/16 |
| 2019/0220781 | A1* | 7/2019 | Vinyals | .................. G06N 20/00 |
| 2019/0378050 | A1* | 12/2019 | Edkin | .................... G06N 20/20 |
| 2020/0356815 | A1 | 11/2020 | Ioannou et al. | |
| 2022/0036177 | A1* | 2/2022 | Sriharsha | ............ G06F 16/2379 |
| 2022/0067577 | A1 | 3/2022 | Serebryakov et al. | |
| 2022/0374327 | A1* | 11/2022 | Engel | .................... G06F 9/5005 |
| 2023/0153570 | A1* | 5/2023 | Guan | .................... G06V 10/82 382/158 |
| 2023/0316041 | A1* | 10/2023 | Yuan | ........................ G06N 3/08 706/25 |

OTHER PUBLICATIONS

Gouheng Zhao et al., "A Machine Learning Based Framework for Identifying Influential Nodes in Complex Networks", IEEE Access ( vol. 8), Mar. 2020, pp. 65462-65471.* aws / amazon-s3-plugin-for-pytorch, download on Dec. 27, 2024, [online]https://github.com/aws/amazon-s3-plugin-for-pytorch, total 6 pages.

* cited by examiner

CONT. FROM

Data is allocated to two training devices through division for storage

| Training node t11-dataset | Training node t21-dataset |
|---|---|
| [A1, A2, A3, A4, A5, A6, A7, A8] | [A9, A10, A11, A12, A13, A14, A15, A16] |

Global data index lists oindexLists are stored in the two training devices

| Training node t11-oindexList | Training node t21-oindexList |
|---|---|
| [1, 2, 3, 4, 5, 6, 7, 8, 9, 10, 11, 12, 13, 14, 15, 16] | [1, 2, 3, 4, 5, 6, 7, 8, 9, 10, 11, 12, 13, 14, 15, 16] |

Shuffled global data index lists sindexLists in the two training devices are the same

| Training node t11-sindexList | Training node t21-sindexList |
|---|---|
| [13, 15, 2, 7, 4, 3, 10, 9, 11, 6, 12, 16, 1, 8, 5, 14] | [13, 15, 2, 7, 4, 3, 10, 9, 11, 6, 12, 16, 1, 8, 5, 14] |

A value of out-of-range is set to 0

| Training node t11-MaskList | Training node t21-MaskList |
|---|---|
| [0, 0, 1, 1, 1, 1, 0, 0, 0, 1, 0, 0, 1, 1, 1, 0] | [1, 1, 0, 0, 0, 0, 1, 1, 1, 0, 1, 1, 0, 0, 0, 1] |

Masking on the shuffled global data index list oindexList

| Training node t11-MasksindexList | Training node t21-MasksindexList |
|---|---|
| [0, 0, 2, 7, 4, 3, 0, 0, 0, 6, 0, 0, 0, 8, 5, 0] | [13, 15, 0, 0, 0, 0, 10, 9, 11, 0, 12, 16, 0, 0, 0, 14] |

Query data performed based on a masked global data index list

| Training node t11-dataList | Training node t21-dataList |
|---|---|
| [X, X, A2, A7, A4, A3, X, X, X, A6, X, X, A1, A8, A5, X] | [A13, A15, X, X, X, X, A10, A9, A11, X, A12, A16, X, X, X, A14] |

Data masking

| Training node t11-MaskdataList | Training node t21-MaskdataList |
|---|---|
| [0, 0, A2, A7, A4, A3, 0, 0, 0, A6, 0, 0, A1, A8, A5, 0] | [A13, A15, 0, 0, 0, 0, A10, A9, A11, 0, A12, A16, 0, 0, 0, A14] |

Data iteration

| Training node t11-batch iterator | Training node t21-batch iterator |
|---|---|

| Training node t11-MaskBatchdata | Training node t21-MaskBatchdata |
|---|---|
| [0, 0, A2, A7] | [A13, A15, 0, 0] |

Node communication module

[A13, A15]         [A2, A7]

| Training node t11 | | Training node t21 |
|---|---|---|

FIG. 5b

CONT. FROM

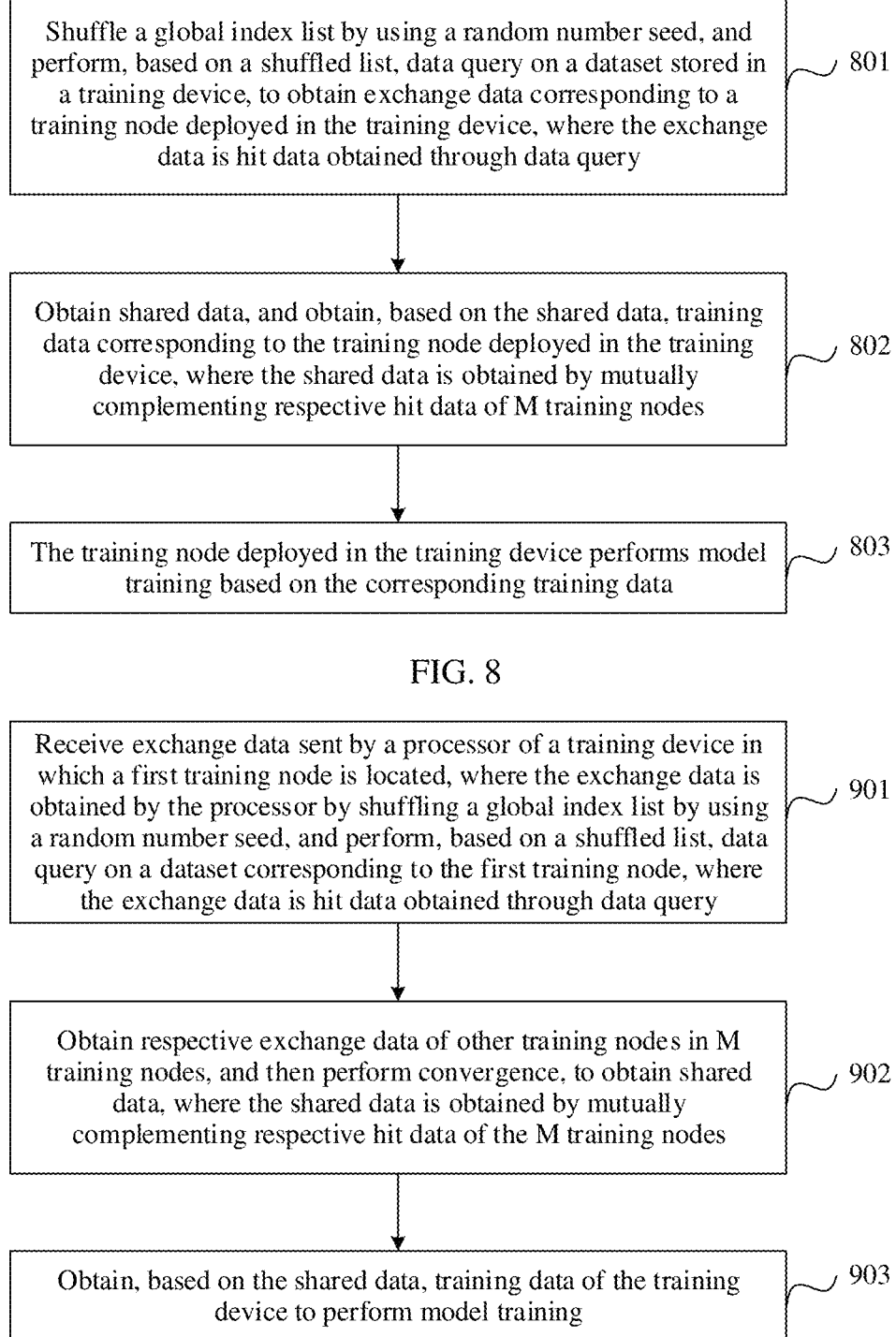

Shuffle a global index list by using a random number seed, and perform, based on a shuffled list, data query on a dataset stored in a training device, to obtain exchange data corresponding to a training node deployed in the training device, where the exchange data is hit data obtained through data query    801

Obtain shared data, and obtain, based on the shared data, training data corresponding to the training node deployed in the training device, where the shared data is obtained by mutually complementing respective hit data of M training nodes    802

The training node deployed in the training device performs model training based on the corresponding training data    803

FIG. 8

Receive exchange data sent by a processor of a training device in which a first training node is located, where the exchange data is obtained by the processor by shuffling a global index list by using a random number seed, and perform, based on a shuffled list, data query on a dataset corresponding to the first training node, where the exchange data is hit data obtained through data query    901

Obtain respective exchange data of other training nodes in M training nodes, and then perform convergence, to obtain shared data, where the shared data is obtained by mutually complementing respective hit data of the M training nodes    902

Obtain, based on the shared data, training data of the training device to perform model training    903

FIG. 9

MODEL TRAINING SYSTEM, MODEL TRAINING METHOD, TRAINING DEVICE, AND TRAINING NODE

CROSS-REFERENCE TO RELATED APPLICATIONS

This application is a continuation of International Application No. PCT/CN2022/095998, filed on May 30, 2022, the disclosure of which is hereby incorporated by reference in its entirety.

TECHNICAL FIELD

This application relates to the field of data processing technologies, and in particular, to a model training system, a model training method, a training device, and a training node.

BACKGROUND

During distributed model training, a plurality of training nodes perform joint training, and a disk of each of training devices in which the plurality of training nodes are located stores a copy of a dataset and a data index of the dataset. When distributed training starts, a data processing thread is responsible for loading the dataset from the disk to an internal memory and performing a series of user-defined data processing operations, such as shuffling and sharding. As shown in FIG. 1, a training node continuously performs training. During each training, data required for current training is sequentially obtained from a dataset based on a data index, and after the data required for current training is obtained, data processing is performed on the data.

When the dataset is extremely large and exceeds storage space of a training device, in a distributed training scenario, a data processing method that depends on a full and complete dataset is infeasible.

Currently, the dataset may be stored in a data center or a database outside the training device. In a distributed training process, the training node may access the dataset in the data center or the database.

However, in the foregoing manner, storing the dataset at a remote end not only increases extra storage overheads, but also reduces read efficiency.

Information disclosed in Background is merely intended to improve understanding of the overall background of the present invention, and should not be considered as an acknowledgment or in any-form implication that the information constitutes a conventional technology well known to persons of ordinary skill in the art.

SUMMARY

Embodiments of the present invention provide a model training system, a model training method, a training device, and a training node. Missing data of each training node is complemented through distributed storage and data exchange of the training node. Without increasing extra storage costs, read efficiency can be improved, and it can be ensured that each training node obtains same shared data, and obtains training data of the training node based on the shared data to perform model training.

According to a first aspect, an embodiment of the present invention provides a model training system, including:

n training devices, in which a total of M training nodes are deployed, where each training device stores a global index list and a dataset corresponding to a training node deployed in the training device, the global index list indicates indexes of data in datasets respectively corresponding to the M training nodes, n is a positive integer greater than or equal to 1, M is a positive integer greater than or equal to n, and each of the n devices meets the following descriptions of a first device:

the first device is configured to: shuffle the global index list by using a random number seed, and query, based on a shuffled list, the dataset stored in the training device, to obtain exchange data of the training node deployed in the training device, where the exchange data is hit data obtained through data query;

the first device is further configured to: obtain shared data, and obtain, based on the shared data, training data corresponding to the training node deployed in the training device, where the shared data is obtained by mutually complementing respective hit data of the M training nodes; and the M training nodes are configured to perform model training based on corresponding training data.

In this solution, missing data of each training node is complemented through distributed storage and data exchange of the training node. Without increasing extra storage costs, read efficiency can be improved, and it can be ensured that each training node obtains same shared data, and obtains training data of the training node based on the shared data to perform model training.

In a possible implementation, for any training node in the M training nodes, the training node is configured to: obtain respective exchange data of other training nodes in the M training nodes, to obtain the shared data, and obtain training data of the training node based on the shared data to perform model training.

In this solution, the training node implements data exchange, so that data exchange efficiency can be improved.

In a possible implementation, the training device is configured to: in a current round in a plurality of round iteration processes, shuffle the global index list by using the random number seed, and perform, based on the shuffled list, data query and batch division on the dataset stored in the training device, to obtain exchange data of the training node deployed in the training device in a current batch in a batch iteration process, where batch division is based on a sequence of indexes indicated by the shuffled list, the sequence of the indexes indicates a data sequence, the current batch is any batch in a plurality of batches in the current round, and shuffled lists in a plurality of rounds are different.

In this solution, through batch iteration, model training efficiency can be improved, and data distribution can be changed, to ensure a data reference value and improve model training effect.

In a possible implementation, the hit data is data hit by performing data query on an exchange index list in the current batch, the exchange index list indicates a data index that is in the current batch and that is obtained by performing batch division on the shuffled list, and respective exchange index lists that are in the current batch and that are of the M training nodes are the same; and the shared data is data obtained by eliminating data that is not hit in the exchange index list and that is of the deployed training node.

In this solution, all training nodes use a same exchange index list in one batch, and finally all the training nodes share data hit by each index value in the index list, to control a data volume of training data in the batch, and avoid a possibility that the data volume in the batch is small or large.

In a possible implementation, the first device is configured to: query, based on the shuffled list, the dataset stored in the first device, to obtain a global mask data list corresponding to the shuffled list; and perform batch division based on the global mask data list, to determine the exchange data of the training node deployed in the first device in the current batch.

In this solution, full data masking is implemented at a time, and the global mask data list is iterated subsequently. Repeated query and masking do not need to be performed in a unit of batch, thereby improving batch iteration efficiency.

In a possible implementation, the first device is configured to: perform mask processing on an index value that is in the shuffled global index list and that is beyond an index range of the dataset stored in the first device, to obtain a global index mask list; and perform, based on the global index mask list, data query on the dataset stored in the first device, to obtain the global mask data list corresponding to the global index mask list.

In this solution, since a data volume of a global dataset of the M training nodes is extremely large, and a data volume of a dataset corresponding to each training node is small, a manner of first masking and then querying is used, so that unnecessary data query overheads can be reduced, and processing efficiency is improved.

In a possible implementation, the global index list includes at least one batch index value corresponding to each of the M training nodes, and the batch index value indicates enhanced batch data that is in one batch and that is in the dataset corresponding to the training node; the first device is configured to perform, in a unit of batch, data enhancement on the dataset stored in the first device, to obtain enhanced batch data of each of at least one batch index value corresponding to the training node deployed in the first device; and the current batch corresponds to a target index value, and the target index value is any one or more of the at least one batch index value; and the hit data is enhanced batch data corresponding to the target index value.

In this solution, data enhancement is performed in the unit of batch, and data in the dataset is fully used without considering impact of other data outside the dataset, so that the data reference value is improved. Therefore, a model can fully learn a relationship between different data.

In a possible implementation, there are a plurality of batch index values corresponding to the training node deployed in the first device, and a local data index list of the dataset corresponding to the training node deployed in the first device is stored; and the first device is configured to: shuffle the local data index list stored in the first device and divide a shuffled list, to determine respective data index lists of the plurality of batch index values corresponding to the training node deployed in the first device; and for any batch index value in the plurality of batch index values, perform, based on a data index list of the batch index value, data query on the dataset stored in the first device, and perform data enhancement on found data, to obtain the enhanced batch data.

In this solution, both the global index list and the dataset are shuffled, and a purpose of full shuffling is achieved through two-level shuffling, so that data distribution is changed, and the data reference value is ensured. Therefore, the model can fully learn the relationship between the different data.

According to a second aspect, an embodiment of the present invention provides a model training method, applied to a training device. The training device is any training device in n training devices, a total of M training nodes are deployed in the n training devices, the training device stores a global index list and a dataset corresponding to a training node deployed in the training device, the global index list indicates at least an index of data in the dataset corresponding to the deployed training node, n is a positive integer greater than or equal to 1, and M is a positive integer greater than or equal to n. The method includes:

shuffling the global index list by using a random number seed, and performing, based on a shuffled list, data query on the dataset corresponding to the training node deployed in the training device, to obtain exchange data corresponding to the training node deployed in the training device, where the exchange data is hit data obtained through data query; obtaining shared data, and obtaining, based on the shared data, training data corresponding to the training node deployed in the training device, where the shared data is obtained by mutually complementing respective hit data of the M training nodes; and performing, by the training node deployed in the training device, model training based on the corresponding training data.

For effective effect in this solution, refer to the foregoing descriptions. Details are not described herein again.

In a possible implementation, the obtaining shared data, and obtaining, based on the shared data, training data corresponding to the training node deployed in the training device includes: The training node deployed in the training device obtains exchange data of other training nodes in the M training nodes, and then performs convergence, to obtain the shared data; and obtains the training data of the training node based on the shared data.

For effective effect in this solution, refer to the foregoing descriptions. Details are not described herein again.

In a possible implementation, the shuffling the global index list by using a random number seed, and performing, based on a shuffled list, data query on the dataset stored in the training device, to obtain exchange data corresponding to the training node deployed in the training device includes: in a current round in a round iteration process, shuffling the global index list by using the random number seed, and performing, based on the shuffled list, data query and batch division on the dataset stored in the training device, to obtain exchange data of the training node deployed in the training device in a current batch in a batch iteration process, where batch division is based on a sequence of indexes indicated by the shuffled list, the sequence of the indexes indicates a data sequence, the current batch is any batch in a plurality of batches in the current round, and shuffled lists in a plurality of rounds are different.

For effective effect in this solution, refer to the foregoing descriptions. Details are not described herein again.

In a possible implementation, the hit data is data hit by performing data query on an exchange index list in the current batch, the exchange index list indicates a data index that is in the current batch and that is obtained by performing batch division on the shuffled list, and respective exchange index lists that are in the current batch and that are of the M training nodes are the same; and the shared data is data obtained by eliminating data that is not hit in the exchange index list and that is of the deployed training node.

For effective effect in this solution, refer to the foregoing descriptions. Details are not described herein again.

In a possible implementation, the shuffling the global index list by using the random number seed, and performing, based on the shuffled list, data query and batch division on the dataset stored in the training device, to obtain exchange data corresponding to the training node deployed in the training device in a current batch in a batch iteration process includes: querying, based on the shuffled list, the dataset stored in the training device, to obtain a global mask data list corresponding to the shuffled list; and performing batch division based on the global mask data list, to determine the exchange data in the current batch.

For effective effect in this solution, refer to the foregoing descriptions. Details are not described herein again.

In a possible implementation, the querying, based on the shuffled list, the dataset stored in the training device, to obtain a global mask data list corresponding to the shuffled list includes: performing mask processing on an index value that is in the shuffled list and that is beyond an index range of the dataset stored in the training device, to obtain a global index mask list; and performing, based on the global index mask list, data query on the dataset stored in the training device, to obtain the global mask data list corresponding to the global index mask list.

For effective effect in this solution, refer to the foregoing descriptions. Details are not described herein again.

In a possible implementation, the global index list includes at least one batch index value corresponding to the training node deployed in the training device, and the batch index value indicates enhanced batch data that is in one batch and that is in the dataset stored in the training device; the current batch corresponds to a target index value, and the target index value is any one or more of the at least one batch index value; the hit data is enhanced batch data corresponding to the target index value; and the method further includes: performing, in a unit of batch, data enhancement on the dataset stored in the training device, to obtain enhanced batch data of each of the at least one batch index value corresponding to the training node deployed in the training device.

For effective effect in this solution, refer to the foregoing descriptions. Details are not described herein again.

In a possible implementation, there are a plurality of batch index values of the training node, and the training device stores a local data index list of the dataset corresponding to the deployed training node; and the method further includes: shuffling the local data index list stored in the training device and dividing a shuffled list, to determine respective data index lists of the plurality of batch index values of the training node deployed in the training device; and for any index value in the plurality of batch index values, performing, based on a data index list of the batch index value, data query on the dataset stored in the training device, and performing data enhancement on found data, to obtain the enhanced batch data.

For effective effect in this solution, refer to the foregoing descriptions. Details are not described herein again.

According to a third aspect, an embodiment of the present invention provides a model training method, applied to a first training node. The first training node is any one of M training nodes, the M training nodes are located in n training devices, each of the n training devices stores a global index list and a dataset corresponding to a training node deployed in the training device, the global index list indicates at least an index of data in a dataset corresponding to the first training node, n is a positive integer greater than or equal to 1, and M is a positive integer greater than or equal to n; and the method includes:

receiving exchange data sent by a processor of a training device in which the first training node is located, where the exchange data is obtained by the processor by shuffling the global index list by using a random number seed, and performing, based on a shuffled list, data query on the dataset corresponding to the first training node, and the exchange data at least includes hit data obtained through data query; obtaining respective exchange data of other training nodes in the M training nodes, and then performing convergence, to obtain shared data, where the shared data is obtained by mutually complementing respective hit data of the M training nodes; and obtaining, based on the shared data, training data of the training node to perform model training.

For effective effect in this solution, refer to the foregoing descriptions. Details are not described herein again.

In a possible implementation, the exchange data is data that is in a current batch and that belongs to the first training node in a next-batch iteration process in one round.

For effective effect in this solution, refer to the foregoing descriptions. Details are not described herein again.

In a possible implementation, the hit data is data hit by performing data query on an exchange index list in the current batch, the exchange index list indicates a data index that is in the current batch and that is obtained by performing batch division on the shuffled list, and respective exchange index lists that are in the current batch and that are of the M training nodes are the same; and the shared data is data obtained by eliminating data that is not hit in the exchange index list.

For effective effect in this solution, refer to the foregoing descriptions. Details are not described herein again.

In a possible implementation, the global index list includes at least one batch index value corresponding to the first training node, the batch index value indicates enhanced batch data that is in one batch and that is in the dataset, and the enhanced batch data is obtained by the processor by performing, in a unit of batch, data enhancement on the dataset corresponding to the first training node; the current batch corresponds to a target index value, and the target index value is any one or more of the at least one batch index value; and the hit data is enhanced batch data corresponding to the target index value.

For effective effect in this solution, refer to the foregoing descriptions. Details are not described herein again.

According to a fourth aspect, an embodiment of the present invention provides a training device, including: at least one memory, configured to store a program; and at least one processor, configured to execute the program stored in the memory. When the program stored in the memory is executed, the processor is configured to perform the method provided in the second aspect.

According to a fifth aspect, an embodiment of the present invention provides a training device. The training device is configured to run a computer program, to perform the method provided in the second aspect.

According to a sixth aspect, an embodiment of the present invention provides a training node, including: at least one processor, configured to run a computer program, to perform the method provided in the third aspect.

According to a seventh aspect, an embodiment of the present invention provides a model training apparatus. The apparatus runs computer program instructions, to perform the method provided in the second aspect, or perform the method provided in the third aspect. For example, the apparatus may be a chip or a processor.

In an example, the apparatus may include a processor. The processor may be coupled to a memory, read instructions in the memory, and perform, according to the instructions, the method provided in the second aspect, or perform the method provided in the third aspect. The memory may be integrated into a chip or a processor, or may be independent of the chip or the processor.

According to an eighth aspect, an embodiment of the present invention provides a model training apparatus, configured to run a computer program, to perform the method provided in the second aspect or perform the method provided in the second aspect.

According to a ninth aspect, an embodiment of the present invention provides a computer storage medium. The computer storage medium stores instructions, and when the instructions are run on a computer, the computer is enabled to perform the method provided in the second aspect or the method provided in the third aspect.

According to a tenth aspect, an embodiment of the present invention provides a computer program product including instructions. When the instructions are run on a computer, the computer is enabled to perform the method provided in the second aspect or the method provided in the third aspect.

BRIEF DESCRIPTION OF DRAWINGS

FIG. 5*a*-1 and FIG. 5*a*-2 are a schematic flowchart 1 of the model training solution according to FIG. 4A and FIG. 4B;

FIG. 5*b* is a schematic flowchart 2 of the model training solution according to FIG. 4A and FIG. 4B;

FIG. 7*a*-1 and FIG. 7*a*-2 are a schematic flowchart 1 of the another model training solution according to FIG. 6A and FIG. 6B;

FIG. 8 is a schematic flowchart of a model training method according to an embodiment of the present invention; and FIG. 9 is a schematic flowchart of another model training method according to an embodiment of the present invention.

DESCRIPTION OF EMBODIMENTS

To make the objectives, technical solutions, and advantages of embodiments of the present invention clearer, the following describes the technical solutions of embodiments of the present invention with reference to the accompanying drawings.

In descriptions of embodiments of the present invention, words such as "example" or "for example" are used to represent an example, an illustration, or a description. Any embodiment or design solution described as "example" or "for example" in embodiments of the present invention should not be interpreted as being more preferred or advantageous than another embodiment or design solution. Specifically, use of the words such as "example" or "for example" is intended to present related concepts in a specific manner.

In descriptions of embodiments of the present invention, a term "and/or" is merely an association relationship for describing associated objects, and indicates that three relationships may exist. For example, A and/or B may indicate: only A exists, only B exists, and both A and B exist. In addition, unless otherwise stated, a term "a plurality of" means two or more than two. For example, a plurality of systems means two or more systems, and a plurality of terminals means two or more terminals.

In addition, terms "first" and "second" are merely used for a description purpose, and shall not be understood as indicating or implying relative importance or implicitly including indicated technical features. Therefore, a feature limited by "first" or "second" may explicitly or implicitly include one or more features. The terms "include", "have", and their variants all mean "include but are not limited to", unless otherwise specifically emphasized in another manner.

Figure 1:
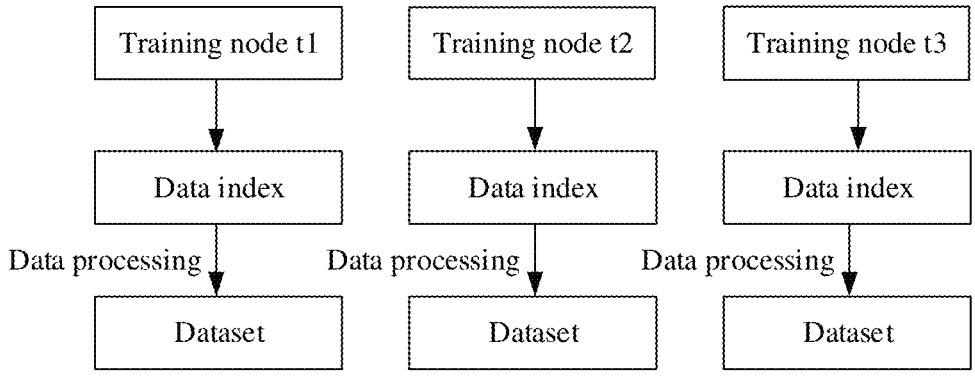
FIG. 1 is an example diagram of distributed model training according to an embodiment of the present invention.

During distributed model training, a plurality of training nodes perform joint training, and a disk of each of training devices in which the plurality of training nodes are located stores a copy of a dataset and a data index of the dataset. When distributed training starts, a data processing thread is responsible for loading the dataset from the disk to an internal memory and performs a series of user-defined data processing operations, such as shuffling and sharding. As shown in FIG. 1, a training node continuously performs training. During each training, data required for current training is sequentially obtained from a dataset based on a data index. After the data required for current training is obtained, data processing is performed on the data.

When the dataset is extremely large and exceeds storage space of a training device, in a distributed training scenario, a data processing method that depends on a full and complete dataset is infeasible. To resolve a training problem of an ultra-large dataset, some solutions already exist in the industry. The following describes two solutions in the industry.

First, the first solution is described.

A data center stores a dataset. A distributed storage file system accesses the dataset in the data center. Data storage and computing are separated. A training device can access the distributed storage file system to access the dataset. In the foregoing technical solution, the dataset is stored in the data center instead of being locally stored in the training device, so that a storage problem of an ultra-large dataset is resolved. A data processing part does not change, and a complete dataset is still seen from a logical perspective of each training device.

However, in the foregoing solution, data needs to be stored in the data center, and therefore extra storage overheads are introduced. When the dataset is large, a hit rate of cached data is low. Once required data is not in the cache, data needs to be continuously accessed from the data center. This takes long time to process the data and becomes a performance bottleneck of model training.

Then, the second solution is described.

A dataset is stored in AWS S3 (Amazon Web Services Simple Storage Service). Based on a high-performance Pytorch dataset library provided by Amazon, a training device can effectively access the dataset stored in AWS S3 without needing to first download the dataset from local storage, to provide a streaming data access interface to access data of any size, so as to resolve a limitation of insufficient storage space of the training device.

However, in the foregoing technical solution, in one aspect, network transmission between the training device and the database needs to be increased, and dataset streaming downloading depends on communication bandwidth. In another aspect, all training nodes perform high-concurrency downloading, but download information is not synchronized between training devices. A download exception of one training node causes an exception of an entire training task.

In the foregoing solution 1 and solution 2, the dataset needs to be accessed from a remote end (the data center or the database outside the training device), and read efficiency is low.

In conclusion, a conventional technology lacks a solution in which both storage space overheads and read efficiency of an ultra-large-scale dataset are considered during distributed training.

Based on this, embodiments of the present invention provide the following technical concepts.

In a first aspect, an ultra-large-scale global dataset is divided in a unit of training node, the global dataset is allocated to all training nodes through division, and is stored, in a distributed manner, in all training devices in which all the training nodes are located.

In a second aspect, each of all the training nodes knows a global index list of a global dataset. The global dataset is used to hit data in the dataset that is known by each of all the training nodes and manage the dataset that is stored in a distributed manner, so that each of all the training nodes knows a global location of the dataset of the training node.

In a third aspect, a training device performs, based on a global index list from a global perspective, data management on a dataset stored in the training device, and then sends the dataset stored in the training device to a corresponding training node.

In a fourth aspect, data of all the training nodes is exchanged, to ensure that missing data of each training node in one batch is complemented, to obtain global data in the batch. After that, training data of all the training nodes are managed and shared based on the global data in the batch. For example, each of all the training nodes uses the global data in the batch as the training data to perform model training. For another example, for any training node, the training node divides the global data in the batch, to obtain the respective training data of all the training nodes, and performs model training based on training data that belongs to the training node; or a processor of a training device in which the training node is located divides the global data in the batch, to obtain the respective training data of all the training nodes, and sends training data of the training node deployed in the training device to the corresponding training node. In some possible cases, the respective training data of all the training nodes complements to each other, to entirely form the global data in the batch. In addition, the global data in the batch is re-allocated to all the training nodes through division, so that requirements of all the training nodes for the training data can be met, and model training effect can be ensured.

It should be noted that the ultra-large dataset is stored, in a distributed form, in all the training devices for distributed training, so that a volume of data read from the remote end is reduced, and read efficiency is improved to some extent.

It should be noted that, the global index list provided in embodiments of the present invention may reflect a data sequence of the global dataset. All the training nodes share the global index list. Correspondingly, data sequences of the global dataset learned by all the training nodes are the same.

In conclusion, in embodiments of the present invention, the global dataset is divided in the unit of training node, and the global dataset is allocated, through division, to a plurality of training devices in which all the training nodes are located. In addition, all the training nodes know the global index list of the global dataset. After data management is performed on the distributed dataset corresponding to the training node based on the global index list, the respective training data of all the training nodes is obtained based on the global data in the batch in cooperation with data exchange.

Figure 2:
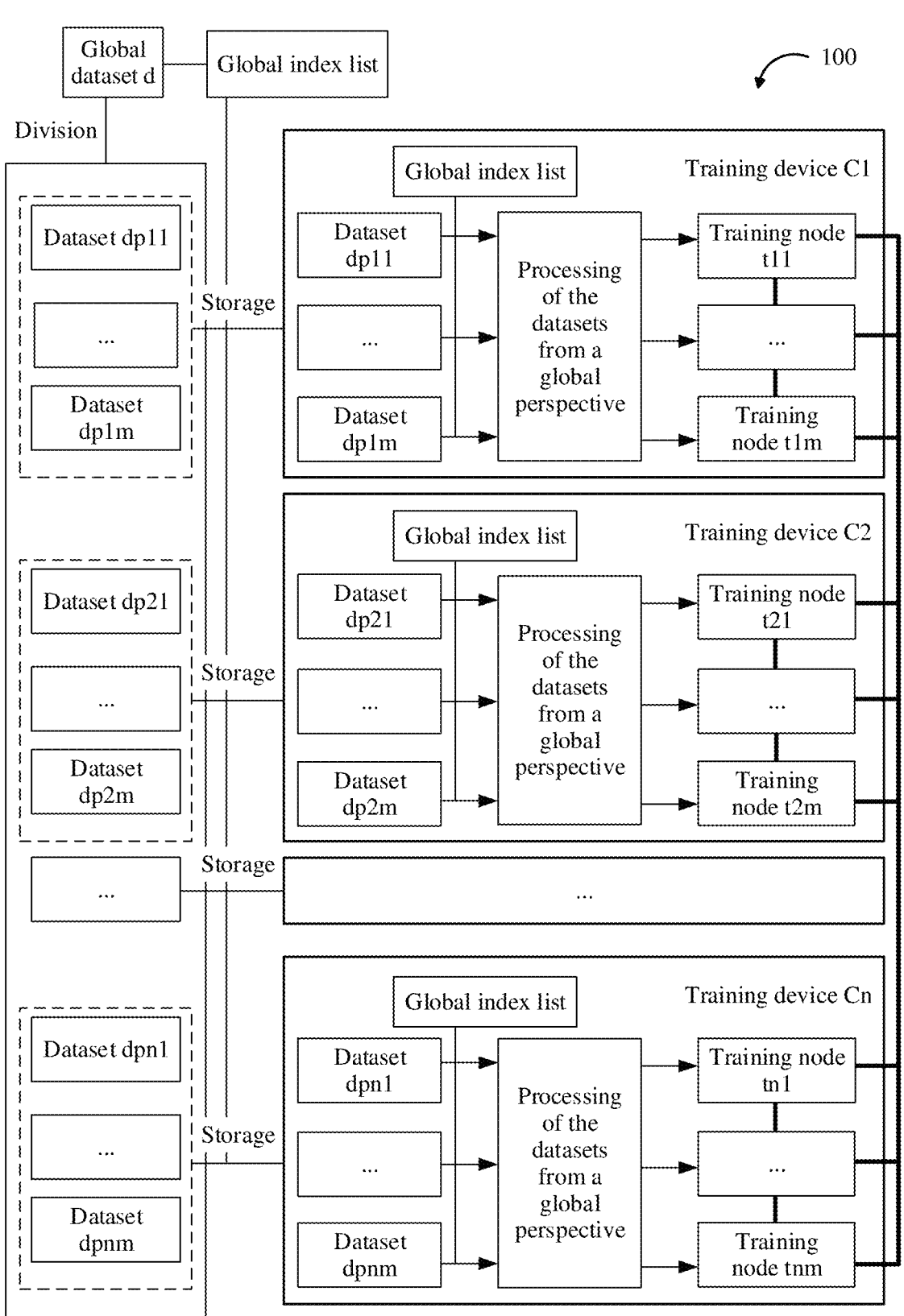
FIG. 2 is a diagram of an architecture of a model training system according to an embodiment of the present invention.

An embodiment of the present invention provides a model training system for implementing the foregoing technical concepts. FIG. 2 is a diagram of a system architecture of a model training system according to an embodiment of the present invention. As shown in FIG. 1, a system 100 includes a plurality of training devices. FIG. 1 schematically shows training devices C1, C2, . . . , and Cn. A total of a plurality of training nodes are deployed in the plurality of training devices, and the plurality of training nodes may communicate with each other. FIG. 1 schematically shows training nodes t11, t12, . . . , and t1*m* of the training device C1, and training nodes t21, t22, . . . , and t2*m* of C2. Other training devices are similar, and details are not described again. FIG. 1 shows a total of n*m training nodes. In an example, a high-speed communication network is established by interconnection between the plurality of training nodes, so that communication time can be reduced, and read efficiency is improved to some extent. FIG. 1 shows interconnection of the n*m training nodes. In actual application, the plurality of training nodes are connected through a cable that can perform high-speed communication. For example, the cable may be an optical cable, to ensure data transmission efficiency. It should be noted that a connection manner between the training nodes in the model training system in FIG. 1 is merely an example. Therefore, FIG. 1 should not be understood as a limitation on the protection scope of the present invention. In actual application, the connection manner between the training nodes may be a central divergence, that is, one training node serves as a central training node, and all other training nodes are connected to the central training node. Herein, the training nodes are connected in a wired manner.

In addition, in some possible implementations, communication between the plurality of training devices may indirectly implement communication between all training nodes. The plurality of training devices communicate with each other over a network. The network may be a wired network or a wireless network. For example, the wired network may be a cable network, an optical network, a Digital Data Network (DDN), or the like, and the wireless network may be a telecommunications network, an internal network, the internet, a Local Area Network (LAN), a Wide Area Network (WAN), a Wireless Local Area Network (WLAN), a Metropolitan Area Network (MAN), a Public Switched Telephone Network (PSTN), a Bluetooth network, a ZigBee network, a Global System for Mobile Communications (GSM), a Code Division Multiple Access (CDMA) network, a General Packet Radio Service (CPRS) network, or any combination thereof. It should be understood that a network 1 may implement communication between different client tiers and a gateway by using any known network communication protocol. The network communication protocol may be various wired or wireless communication protocols, such as Ethernet, universal serial bus (USB), firewire, global system for mobile communication (GSM), general packet radio service (GPRS), code division multiple access (CDMA), wideband code division multiple access (WCDMA), time-division code division multiple access (TD-SCDMA), long term evolution (LTE), new radio (NR), Bluetooth, wireless fidelity (Wi-Fi), and other communication protocols.

In this embodiment of the present invention, a global dataset is divided based on a quantity of training nodes to obtain a dataset, and the dataset is stored in a training device in which a corresponding training node is located. In other words, the training device stores a dataset that corresponds to each training node and that is in the training device. An example in which n training devices shown in FIG. 1 are disposed with a total of n*m training nodes is used for description. A global dataset is divided into n*m datasets, and each training device actually holds m datasets, that is, 1/n of the global dataset. It should be noted that, in actual application, data volumes of the n*m datasets may be different. How to divide the global dataset is not specifically limited in this embodiment of the present invention, and may be specifically set based on an actual requirement. For example, more data is allocated to a training node with strong computing power, and less data is allocated to a training node with weak computing power.

All training devices in this embodiment of the present invention share a global index list of a global dataset, so that data iteration is performed based on the global index list in a unit of round. In each round, for any training node, a training device in which the training node is located performs, based on the global index list, data query and batch division on a dataset corresponding to the training node, to obtain data (for ease of description and differentiation, referred to as exchange data) that belongs to the training node and that is in a current batch in batch iteration in the round and that is used for exchange. Exchange data of all training nodes complements to each other to entirely form global data in the current batch. Herein, the round indicates a quantity of times of traversing all data in the dataset, and the batch indicates a quantity of copies of the dataset that need to be divided in one round. Batch division in this embodiment of the present invention may be understood as that the dataset is divided in a unit of batch, to obtain data in different batches. The data in the batches are different or partially the same, to entirely form the dataset. After one round is completed, that is, after all data in the dataset is iterated once, the dataset is re-divided equally to obtain data in different batches in a next round. The foregoing operation is continuously repeated to implement model training. For example, if a quantity of batches is 8, the dataset is divided into data in eight batches. Here, the current batch is a batch at a current moment.

Then, any training device converges the exchange data of all the training nodes, that is, complements missing data of the training node in the current batch, to obtain the global data in the current batch (data obtained after the respective exchange data of all the training nodes is converged), and to obtain, based on the global data in the current batch, training data of a training node deployed in the training device, so that the training node deployed in the training device performs model training based on the corresponding training data.

In an example, all the training nodes each use the global data in the current batch as training data to perform model training, so that all the training nodes perform model training based on same training data. In another example, all the training nodes each divides the global data in the current batch, to obtain respective training data of all the training nodes, and each training node performs model training based on training data that belongs to the training node. It should be noted that, when the global data in the current batch needs to be divided into the training data of all the training nodes, the global data in the current batch is usually represented in a list manner, and all the training nodes share the list, so that the respective training data of all the training nodes may be managed and shared based on the list.

The following describes in detail how all the training nodes obtain the respective training data in a scenario in which the global data in the current batch is divided to obtain the respective training data of all the training nodes.

Specifically, the training device stores respective ranking numbers of all the training nodes. A processor of the training device or the training node slices, based on a quantity of training nodes, a data list indicating the global data in the current batch, to obtain segments respectively corresponding to different numbers, and uses the segments as training data of the training nodes corresponding to the numbers. In addition, training data of a part of the training nodes may partially overlap. In an example, for any training node, the training node or a processor of a training device in which the training node is located may obtain the respective training data of all the training nodes by sliding a one-dimensional window at a specific step on the data list indicating the global data in the current batch. In an example, for any training node, the training node or a processor of a training device in which the training node is located may perform overlapping division on the global data in the current batch based on a quantity of all the training nodes, to obtain the respective training data of all the training nodes.

In an example, the processor of the training device obtains exchange data, and sends the exchange data to a corresponding training node. For any training node deployed in the training device, the training node obtains respective exchange data of other training nodes and then converges the exchange data of all the training nodes, to obtain the global data in the current batch; and obtains the respective training data of all the training nodes based on the global data, and performs model training based on the training data of the training node.

When there is a central training node and the training node is not the central training node, the training node sends the exchange data to a corresponding central training node, and receives global data or training data sent by the training central node; and when receiving the global data, obtains the respective training data of all the training nodes based on the global data, and performs model training based on the training data of the training node.

When the training node is the central training node, the training node may further send training data other than that of the training node to a corresponding training node, and the training node performs model training based on the training data. In some possible implementations, the global data in the current batch may also be sent to each of other training nodes. It should be noted that sending the global data not only increases computing overheads of the training node, but also increases communication overheads. Therefore, the training data is preferably sent.

It should be noted that, when shared data is the training data, after obtaining the shared data, the training node uses the shared data as the training data to perform model training.

Herein, inter-node communication can ensure data obtaining efficiency.

In an example, for any training device, a processor of the training device converges the exchange data of all the training nodes, to obtain the global data in the current batch.

It should be noted that, if there is only one training device, the processor of the training device may directly obtain the respective exchange data of all the training nodes, and then perform convergence, to obtain the global data in the current batch. If there are a plurality of training devices, the plurality of training devices may communicate with each other, and a processor of each training device obtains the global data in the current batch.

Further, the processor may send the global data to the training node, and the training node obtains the respective training data of all the training nodes based on the global data, and performs model training based on the training data of the training node.

Alternatively, the processor may obtain the respective training data of all the training nodes based on the global data in the batch, and send training data that belongs to the processor to a corresponding training node, and the training node directly performs model training based on the training data.

Herein, since obtaining the training data by the processor increases calculation overheads, the exchange data is preferably sent to the training node.

When there is a central training device and the training device is not the central training device, a processor of the training device sends the exchange data to a corresponding central training device, and receives global data or training data sent by the training center node; when receiving the global data, obtains the respective training data of all the training nodes based on the global data, and sends training data that belongs to the processor of the training node to a corresponding training node; and when receiving the training data, sends the training data to a corresponding training node.

When the training device is the central training device, the processor may further send training data other than that of the training device to a corresponding training node. In some possible implementations, the processor may alternatively send the global data in the current batch to a processor of each of other training devices. Herein, sending the global data not only increases computing overheads of the processor, but also increases communication overheads. Therefore, the training data is preferably sent.

It should be noted that, when shared data is the training data, the processor of the training device obtains the shared data and then sends the shared data as the training data to each training node deployed in the training device.

It should be noted that the foregoing data communication manner is merely used as an example, and does not constitute a specific limitation, and may be specifically determined based on an actual requirement.

The exchange data may be only hit data. In some possible implementations, the exchange data may include the hit data and mask data. In actual application, the exchange data is represented in a list manner.

Herein, for any training node, hit data of the training node in the current batch is used to describe all data found in a dataset corresponding to the training node in the current batch. In addition, hit data of all the training nodes is different and complement to each other, to entirely form global data in one batch. The mask data in the exchange data of the training node is used to describe data obtained after mask processing is performed on data that is in the global data in the current batch and that is other than the hit data that belongs to the training node.

It should be noted that, for any training node, in a process of obtaining the exchange data, an index list is required (for ease of description and differentiation, referred to as an exchange index list, where the exchange index list is obtained by dividing a global index list based on a quantity of batches, and is a continuous sequence in the global index list, that is, a fragment) for performing data query to obtain the exchange data of the training node. For any training node, obtaining the exchange data of the training node may be understood as performing, based on the exchange index list, data query on a dataset corresponding to the training node, and using found data as the hit data. For an index value using which no data is found, it is considered that data of the index value under the training node is missing, and the mask data can be obtained by masking the missing data. Herein, the hit data is data hit by each index value in the exchange index list. The mask data is padding_data (that is, a mask value) of each index value that is not hit in the exchange index list. Herein, hit may be understood as that data is found.

It should be noted that, in actual application, the training device may not generate the exchange index list, and the exchange index list is merely a mapping relationship of the exchange data in the global index list. Herein, the exchange index list is merely introduced to facilitate description and description of the essence of implementation of the technical solution.

In this embodiment of the present invention, a data volume and data content of hit data that is of a training node and that is in exchange data in one batch are controlled based on an exchange index list of the training node in the batch. Since global data in the batch is obtained by mutually complementing hit data of M training nodes in the batch, a data volume of the global data in the batch may be controlled based on exchange index lists of the M training nodes. If the data volume of the global data in the batch needs to be ensured, the exchange index lists corresponding to the exchange data of the M training nodes in the batch are the same. In actual application, when performing data query based on the exchange index list, each training node obtains only data hit by a part of index values. After the respective exchange data corresponding to all the training nodes is converged, data hit by all index values in the exchange index lists may be obtained. If it further needs to be ensured that data volumes of the global data in different batches are the same, lengths of exchange index lists in the different batches are the same. Herein, different exchange index lists indicate global data in different batches. It should be noted that, if a part of the training nodes use different exchange index lists in one batch, it is difficult to ensure a data volume of global data in the batch, and the data may be excessively less or excessively more. Therefore, preferably, all the training nodes determine, in the batch based on a same exchange index list, the exchange data respectively corresponding to the training nodes.

When the exchange data is hit data, or exchange index lists used by some or all of the training nodes in one batch are different, if global data in the current batch needs to be divided into respective training data of all the training nodes, after obtaining exchange data of other training nodes, the training node concatenates hit data of all the training nodes in a preset node sequence, and an obtained data list is used as the global data in the current batch. Herein, all the training nodes share the data list. Then, all the training nodes may manage and share the respective training data of all the training nodes based on the global data in the current batch, and each training node performs model training based on training data that belongs to the training node.

The following uses an example in which all the training nodes have a same exchange index list in one batch for description.

In actual application, all the training nodes have a same exchange index list in a current batch, and the exchange index list indicates an index of global data in the current batch. In this case, index values corresponding to respective hit data of all the training nodes in the current batch are different, to entirely form the exchange index list. In this embodiment of the present invention, hit data in respective exchange data of all the training nodes complement to each other, to entirely form the global data in the current batch. Therefore, if the exchange data includes mask data, for any training node, global data that is in one batch and that corresponds to the training node may be understood as data obtained after the mask data in the exchange data of the training node is eliminated. In conclusion, each training node may obtain hit data that is of the training node and that is in the exchange index list. After the exchange data of all the training nodes is converged, all the training nodes may know data bit by each index value in the exchange index list, and use the data as the global data in one batch, to ensure that all the training nodes manage and share respective training data of all the training nodes based on the same global data.

In addition, different exchange index lists may be determined based on a global index list. Each exchange index list may correspond to one batch, and different exchange index lists correspond to different batches. Global data in batches is data hit by all index values in corresponding exchange index lists, that is, found data. Since the data hit by the index values in the exchange index lists corresponding to the batches is distributed in different training nodes in a distributed manner, missing data of each training node in one batch may be complemented by exchanging the exchange data of the training node. In actual application, if the data in the batches is completely different, the global index list may be divided based on a quantity of batches to obtain a plurality of exchange index lists; or if data in different batches partially overlaps, the plurality of exchange index lists may be obtained by sliding a one-dimensional window at a specific step on the global index list.

For a manner of obtaining the exchange data, the exchange data may be specifically obtained in the following three implementations.

Implementation 1: For any training device, a processor of the training device performs batch division on a global index list, to determine an exchange index list shared by all training nodes in a current batch. Any training node performs data query, based on the exchange index list, on a dataset corresponding to the training node, to obtain the exchange data.

In actual application, data query is performed, based on the exchange index list, on the dataset corresponding to the training node, and all found data is used as hit data. If the exchange data includes mask data, mask processing is performed on data other than the hit data to obtain a local mask list of the exchange index list, where the list is the exchange data.

This embodiment of the present invention does not intend to limit a manner of determining the exchange index list. A plurality of exchange index lists may be determined by sliding a one-dimensional window at a specific step on the global index list, or may be obtained by equally dividing the global index list based on a quantity of batches. This may be specifically determined based on an actual requirement, and is not specifically limited in embodiments of the present invention.

This implementation is essentially performed by the processor of the training device.

Implementation 2: For any training node, a processor of a training device in which the training node is located performs, based on a global index list, data query on a dataset corresponding to the training node, to obtain a global mask data list that belongs to the training node, and performs batch division based on the global mask data list to determine the exchange data.

In actual application, a list in a current batch (for ease of description and differentiation, referred to as a local mask list) may be obtained by sliding a one-dimensional window at a specific step on the global mask data list, or may be obtained by equally dividing the global mask data list based on a batch size, and the local mask list is used as the exchange data, or valid data (that is, the foregoing hit data) in the local mask list is used as the exchange data.

Herein, the global mask data list and the global index list are in a correspondence. Therefore, processing on the global mask data list essentially reflects processing on the global index list, and therefore the exchange data obtained by performing data query on the exchange index list may be obtained.

Implementation 3: For any training device, a processor of the training device performs batch division on a global index list, to determine an exchange index list shared by all training nodes in a current batch. Any training node performs data query, based on the global index list, on a dataset corresponding to the training node, to obtain a global mask data list that belongs to the training node. The exchange data is determined based on a list that is in the global mask data list and that corresponds to the exchange index list.

In actual application, the list that is in the global mask data list and that corresponds to the exchange index list (for ease of description and differentiation, referred to as a local mask list) may be determined, and the local mask list is used as the exchange data, or valid data (that is, the foregoing hit data) in the local mask list is used as the exchange data.

It should be noted that exchange index lists in the current batch of all the training nodes are the same, and the exchange data is the local mask list. If global data in the current batch needs to be divided into respective training data of all the training nodes, the global data in the current batch is a data list (formed by data hit by each index value in the exchange index list) that is of the exchange index list and that is obtained by eliminating mask data in a local mask list corresponding to any training node. Here, all the training nodes share the data list of the exchange index list. The respective training data of all the training nodes is managed and shared based on the data list of the exchange index list, and each training node performs model training based on training data that belongs to the training node.

In a feasible case, data in a global dataset is independent of each other. That data is independent of each other means that no data enhancement operation that affects other data needs to be performed between the data. Any index value in a global index list is used to query a piece of data in the global dataset, and the piece of data may be understood as a sample. In actual application, a piece of data is stored in a key-value pair key-value manner. In an example, an index value may be understood as a key. Since the global dataset is large, the key occupies a large amount of storage space. In an example, the index value may alternatively be a value, for example, a hash value, that is obtained by mapping the key and that is used for data query, to reduce storage space occupied by the global index list. It should be noted that, in this embodiment of the present invention, data processing may need to be performed on the piece of data, for example, data enhancement, data cleaning, data selection, image decoding, image cropping, image scaling, image normalization, image transformation channel, text-to-lexicographic order conversion, text masking, and text supplementation. For example, the piece of data may be image, text, voice data, or the like. However, since the index value does not change, in a process of data query, the piece of data in the dataset and data obtained after data processing is performed on the piece of data may be found. Herein, a specific type of data to be selected as the exchange data needs to be determined based on an actual requirement. This is not specifically limited in embodiments of the present invention. For example, any node performs data query, based on the exchange index list, on a dataset corresponding to the training node, and all found data is used as hit data of the training node.

In an example, the global mask data list may be specifically implemented in the following manner.

For any training node, a processor of a training device in which the training node is located queries, for each index value in the global index list, a dataset corresponding to the training node based on the index value. If data is not hit, padding_data is generated, and each index value in the global mask data list is replaced with found data or padding_data, to obtain the global mask data list. Padding_data is mask data, indicate that data is not in the dataset, and may be a value such as 0 or −1.

For example, there are two training nodes. If a global index list is [4, 6, 1, 3, 0, 2, 5, 7], a data list corresponding to [4, 6, 1, 3, 0, 2, 5, 7] is [data4, data6, data1, data3, data0, data2, data5, data7], that is, a global dataset. If data held by a training node 0 is [data0, data1, data2, data3], a global mask data list finally generated by the training node 0 is [padding_data, padding_data, data1, data3, data0, data2, padding_data, padding_data]. If data held by a training node 1 is [data4, data5, data6, data7], a global mask data list finally generated by the training node 1 is [data4, data6, padding_data, padding_data, padding_data, padding_data, data5, data7]. If an exchange index list is [4, 6, 1, 3], exchange data of the training node 0 is [padding_data, padding_data, data1, data3], and valid data (that is, the foregoing hit data) is data1 and data3; and exchange data of the training node 1 is [data4, data6, padding_data, padding_data], and valid data (that is, the foregoing hit data) is data4 and data6. After performing data exchange, the training node 0 and the training node 1 separately perform model training based on [data4, data6, data1, data3].

In another feasible case, data in a global dataset is not independent of each other. That data is not independent of each other means that a data enhancement operation that affects other data in a unit of batch is performed between the data (for example, if a weighted averaging operation needs to be performed on data 1 and data 2 in one batch, it indicates that samples are not independent of each other). An index value in the global index list is used to query data in one batch in the dataset. In actual application, the data in the batch is stored in a key-value pair key-value manner, and the index value may be understood as a key. In some feasible manners, the index value may alternatively be a value, for example, a hash value, that is obtained by mapping the key and that is used for data query. It should be noted that, in this embodiment of the present invention, data processing, for example, convergence processing such as data enhancement, may need to be performed on the data in the batch. For example, if the data in the batch is a plurality of images, data processing may be an operation such as picture convergence.

However, since the index value does not change, in a process of data query, the data in the batch in the dataset and data obtained after data processing is performed on the data in the batch may be found. Herein, a specific type of data to be selected as the exchange data needs to be determined based on an actual requirement. This is not specifically limited in embodiments of the present invention. For example, for any training node, a training device in which the training node is located stores data in batches respectively corresponding to a plurality of batch index values of the training node, and performs data enhancement on data in each batch to obtain enhanced data in the batch (for ease of description and differentiation, referred to be as enhanced batch data). Correspondingly, batch query is performed on the enhanced batch data of the training node based on the exchange index list, and all found enhanced batch data as hit data of the training node.

It should be noted that the global index list is formed by respective batch index values of all the training nodes, and a quantity of index values in the global index list is $$\sum_{i=1}^{M} N_i,$$

where M indicates a total quantity of training nodes, and $N_i$ indicates a quantity of index values of an $i^{th}$ training node. For any training node, data that is in a batch and that is obtained by querying all index values of the training node forms a dataset corresponding to the training node. In actual application, quantities of batch index values of all the training nodes may be the same, may be different, or may be partially the same. This may be specifically determined based on an actual requirement. This is not specifically limited in embodiments of the present invention. For example, a quantity of batch index values of a training node with strong computing capability is large, and a quantity of batch index values of a training node with weak computing capability is small. In an example, the global mask data list may be specifically implemented in the following manner.

For any training node, a processor of a training device in which the training node is located performs, for each index value in the global index list, batch data query on a dataset corresponding to the training node based on the index value. If data is not hit, padding_Batch_data is generated, and each index value in the global mask data list is replaced with found enhanced batch data or mask batch data, to obtain the global mask data list. Padding_Batch_data indicates that data in the batch is not in the dataset, and includes a plurality of pieces of padding_data. A quantity of pieces of padding_data is the same as a quantity of pieces of data in the enhanced batch data.

If the global mask data list is constructed first, that is, the index value is replaced with found data in one batch, batch enhancement performed after batch division is performed on the mask data list subsequently is affected by padding_data. This may cause information missing and incompleteness of data obtained after data enhancement is performed, and reduce a reference value of the training data. Based on this, in this embodiment of the present invention, data enhancement is performed in a unit of batch, and is not affected by padding_data.

For example, there are two training nodes. If a global index list is [4, 6, 1, 3, 0, 2, 5, 7], a batch data list corresponding to [4, 6, 1, 3, 0, 2, 5, 7] is [Batchdata4, Batchdata6, Batchdata1, Batchdata3, Batchdata0, Batchdata2, Batchdata5, Batchdata7], that is, a global dataset.

Batchdatai indicates data in one batch, and may be a plurality of pieces of data, denoted as datai1, datai2, . . . , where i=0, 1, 2, . . . . A batch data list held by a training node 0 is [Batchdata0, Batchdata1, Batchdata2, Batchdata3], and corresponds to a batch index list [0, 1, 2, 3]. If an enhanced batch data list corresponding to [0, 1, 2, 3] is [eBatchdata0, eBatchdata1, eBatchdata2, eBatchdata3], a global mask data list finally generated by the training node 0 is [padding_Batch_data, padding_Batchdata, eBatchdata1, eBatchdata3, eBatchdata0, eBatchdata2, padding_Batch_data, padding_Batch_data]. A batch data list held by a training node 1 is [Batchdata4, Batchdata5, Batchdata6, Batchdata7], and corresponds to a batch index list [4, 5, 6, 7]. If an enhanced batch data list corresponding to [4, 5, 6, 7] is [eBatchdata4, eBatchdata5, eBatchdata6, eBatchdata7], a global mask data list finally generated by the training node 1 is [eBatchdata4, eBatchdata6, padding_Batch_data, padding_Batch_data, padding_Batch_data, padding_Batch_data, eBatchdata5, eBatchdata7]. Herein, a quantity of pieces of padding_data in padding_Batch_data is the same as a data volume of the enhanced batch data. For example, if eBatchdata4 includes 10 pieces of data, padding_Batch_data includes 10 pieces of padding_data. If an exchange index list is [4, 6, 1, 3], exchange data of the training node 0 is [padding_Batch_data, padding_Batchdata, eBatchdata1, eBatchdata3], and valid data (that is, the foregoing hit data) is eBatchdata1, eBatchdata3; and exchange data of the training node 1 is [eBatchdata4, eBatchdata6, padding_Batch_data, padding_Batch_data], and valid data (that is, the foregoing hit data) is eBatchdata4 and eBatchdata6. After performing data exchange, the training node 0 and the training node 1 separately perform model training based on [eBatchdata4, eBatchdata6, eBatchdata1, eBatchdata3].

In actual application, the model training system provided in this embodiment of the present invention needs to perform a plurality of rounds of iteration. In each round of iteration, a global index list may be shuffled, and all training nodes share a shuffled list. The training device implements dataset management based on the shuffled list, to implement batch iteration. In addition, shuffled lists are different in different rounds, so that exchange index lists are different, and further exchange data changes. However, all the training nodes in each round share the shuffled list. An advantage of shuffling is to disorder a data sequence, change data distribution, and improve a data reference value. In addition, the data in the global dataset is not independent of each other. The dataset corresponding to the training node may be further shuffled to obtain shuffled data. After batch packaging is performed on the shuffled data, data enhancement is performed in a unit of batch. In this way, both the global index list and the data in the batch are shuffled, and through two-level shuffling, the data sequence is fully disordered, the data distribution is changed, and the data reference value is improved. In addition, after the global dataset is traversed based on the batch, the global index list needs to be reshuffled to construct a new data sequence, so as to construct different batches, and ensure the data reference value.

In an example, the training device may be configured to provide a cloud service. The training device may be a hardware server that can establish a communication connection to an electronic device and that can provide a computing function and/or a storage function for the electronic device. The electronic device may be a device used by a user, for example, a mobile phone, a computer, a wearable device, or a sound box.

In an example, the training device in this embodiment of the present invention may be a high-performance computing device, for example, a server. In addition, the training node may be an accelerator chip (a computing chip used for model training), for example, an NPU (Neural-network Processing Unit, embedded neural network processor) or a GPU (Graphics processing unit, graphics processing unit). For example, typically, one accelerator chip, or two, four, or eight accelerator chips may be inserted into one server, the accelerator is a computing device used for model training, and one accelerator chip is one training node. The training node may train any model. This embodiment of the present invention is not intended to limit a type and a structure of the model.

The foregoing describes the model training system in this solution. The following describes the training device in the model training system.

Figure 3:
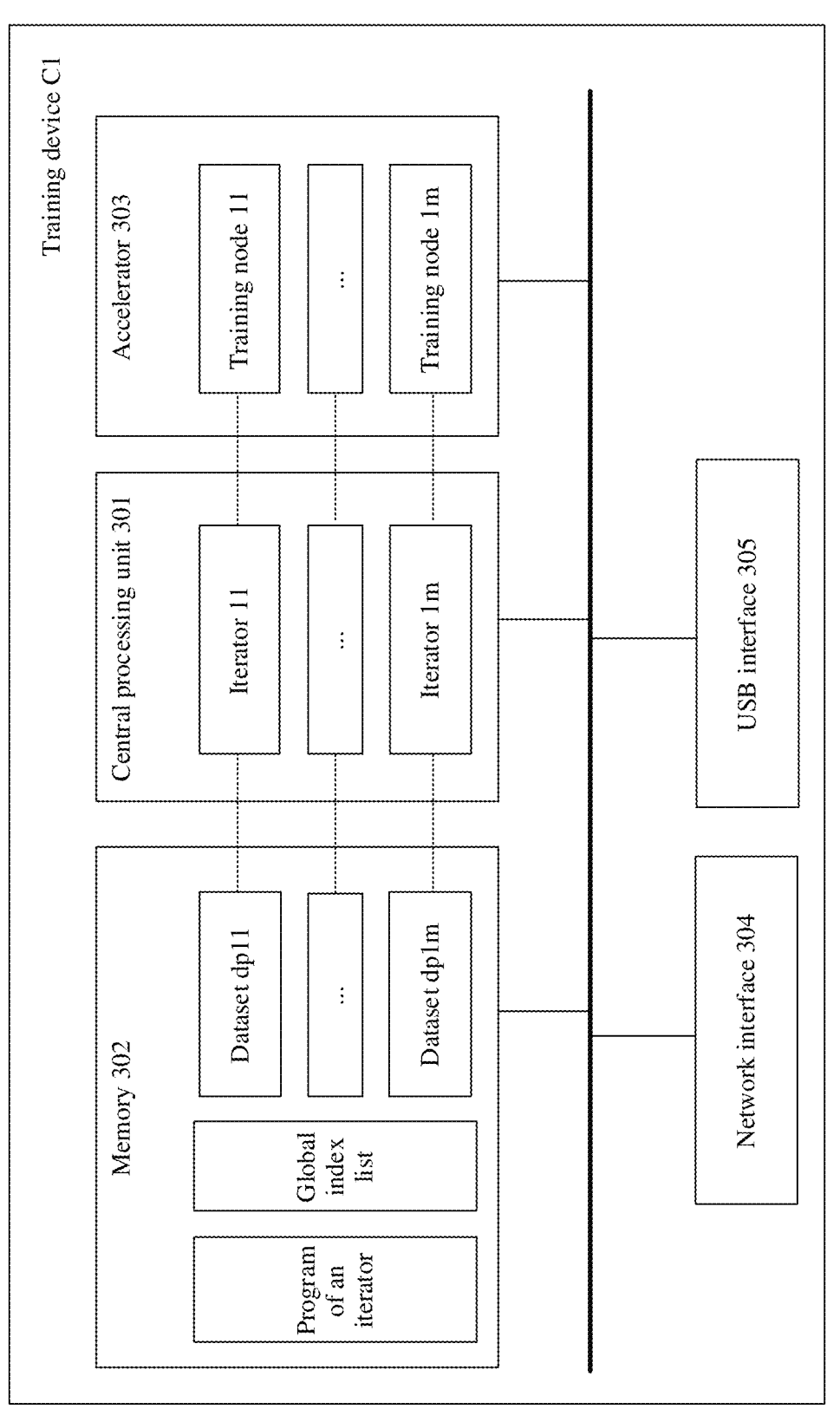
FIG. 3 is a diagram of a structure of a training device according to an embodiment of the present invention.

FIG. 3 is an example diagram of a structure of a training device C1 according to an embodiment of the present invention. As shown in FIG. 3, the training device C1 includes a central processing unit 301, a memory 302, an accelerator 303, and a network interface 304. The central processing unit 301, the memory 302, the accelerator 303, and the network interface 304 may be connected through a bus or in another manner.

The memory 302 (memory) is configured to store a program and data, for example, storing a dataset corresponding to a training node, a global index list of a global dataset, and a program of an iterator (used to manage the dataset corresponding to the training node from a global perspective based on the global index list) and storing an operating system, where the operating system includes but is not limited to a YindoYs system (an operating system), a Linux system (an operating system), a HarmonyOS (an operating system), and the like. This is not limited herein. The memory 302 includes a main memory and an auxiliary memory. The main memory is also referred to as an internal memory (memory for short), and the auxiliary memory is also referred to as an external memory (external memory for short). The external memory may store information for long time and does not rely on electricity to store the information. However, the external memory is driven by a mechanical component, and a speed of the external memory is much slower than that of the central processing unit 301. The external memory is usually a non-volatile memory (non-volatile memory), for example, at least one hard disk, a floppy disk, a magnetic tape, or a CD, and is configured to store a dataset, a global index list, a program of an iterator, and an operating system. The internal memory is a storage component that is on a main board and that directly communicates with the central processing unit 301 and stores data, and the component is used to store data and a program that are currently in use (that is, being executed). Physical essence of the internal memory is one or more groups of integrated circuits with data input, data output, and data storage functions. The internal memory is only used to temporarily store the program and the data. Once the power is turned off or power failure occurs, the program and the data in the internal memory are lost. The memory is usually a volatile memory, for example, a high-speed random access memory (Random-Access Memory, RAM). In actual application, in this embodiment of the present invention, the dataset, the global index list, and the program of the iterator that are stored in a hard disk are loaded to the internal memory, and the central processing unit 301 reads the program of the iterator, the dataset, and the global index list from the internal memory.

The central processing unit 301 is a computing core and a control core of a computer 110. For example, the central processing unit 301 may read the global index list, the dataset, and the program of the iterator from the internal memory, execute the program of the iterator, manage the dataset from a global perspective based on the global index list, to obtain the exchange data, the global data in the current batch, or the training data of the training node, and send the exchange data, the global data in the current batch, or the training data of the training node to the training node. In addition, when there are m datasets, the central processing unit 301 may establish m processes of an iterator of the training device C1, and an iterator ij is used to indicate a data processing process of a tij$^{th}$ training node of a Ci$^{th}$ training device. In this case, data processing processes of the m training nodes of the training device C1 are referred to as an iterator 11, . . . , and an iterator 1m, and the m processes are executed in parallel.

The accelerator 303 is a core of model training, and includes a training node t11, . . . , and a training node t1m. For any training node, the accelerator 303 is configured to receive exchange data, global data, or training data that is in the current batch and that is sent in a process execution process of the processor 301; when receiving the exchange data, is further configured to: communicate with a training node of another training device, converge exchange data of all the training nodes, to obtain the global data in the current batch, and obtain the training data of the training node based on the global data in the current batch to perform model training; when receiving the global data, is further configured to obtain the training data of the training node based on the global data in the current batch to perform model training; and when receiving the training data, directly performs model training based on the training data. The accelerator 303 may include a plurality of accelerator chips, for example, a GPU (Graphic Processing Unit, graphics processing unit), a MIC (Many Integrated Core, many-core coprocessor), and an NPU (Neural-network Processing Unit, embedded neural network processor). In an example, in embodiments of the present invention, one accelerator chip is used as one training node.

The network interface 304 is configured to send and receive data, for example, send data processed by the processor 301 to another electronic device, or receive data sent by another electronic device. The network interface 304 may include a standard wired interface and a standard wireless interface (such as a YI-FI or a mobile communication interface). This needs to be specifically determined based on an actual requirement.

In addition, a training device 1 may further include a USB interface 305. The USB interface 305 is configured to interact with an external storage device, for example, receive a dataset sent by the external storage device.

Further, the training device C1 in embodiments of the present invention may further include another processing unit, for example, another general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The general-purpose processor may be a microprocessor or any regular processor. Herein, different processing units may be independent components, or may be integrated into one component.

It should be noted that, the central processing unit 301 of the training device CI processes the dataset to obtain the foregoing exchange data, the training node performs inter-node communication and model training, and the central processing unit 301 and the training node may perform processing in parallel, thereby improving processing efficiency. In addition, the training node may also implement inter-node communication and model training in parallel.

In addition, for structures of a training device C2, . . . , and a training device Cn, refer to that of the training device C1. Details are not described herein again. It should be noted that, in actual application, m processes of central processing units 301 of each of n training devices are executed in parallel. In addition, programs of iterators stored in the n training devices are the same, and a difference lies only in different processed data, but data processing manners are the same.

For ease of description and differentiation, the following uses training devices C1, . . . , and Cn and n*m training nodes t11, t12, . . . , t1m, . . . , and tnm shown in FIG. 1 as examples for description. It is assumed that data processing processes respectively corresponding to the n*m training nodes are the iterator 11, the iterator 12, . . . , the iterator 1m, . . . , and the iterator nm shown in FIG. 3. A training device Ci includes an iterator i1, an iterator i2, . . . , and an iterator im. The iterator 11, . . . , and the iterator nm perform parallel execution. Since data processing manners of all data processing processes are the same, the following mainly uses the iterator 11 as an example to describe the data processing process.

The foregoing describes the model training system in this solution and the training device in the model training system. The following describes in detail a model training solution of the training device in this solution based on the model training system described in FIG. 1 and a schematic diagram of a model training solution provided in an embodiment of the present invention shown in FIG. 4A and FIG. 4B. It should be noted that a main application scenario of the model training solution is: Data in a global dataset is independent of each other, and an index value in a global index list is used to query a piece of data in the global dataset. Herein, for ease of description and differentiation, the global index list is referred to as a global data index list, and the index value is referred to as a data index value. Details are shown in the following descriptions.

Step 11: Each of the n training devices stores a global data index list and datasets respectively corresponding to m deployed training nodes, where the global data index list is used to hit datasets respectively corresponding to n*m training nodes, and the datasets respectively corresponding to the n*m training nodes are obtained by performing n*m equal division on one global dataset.

Step 12: For any node in the n*m training nodes, a training device in which the training node is located performs shuffling on a global data index list by using a random number seed shared by the n*m training nodes, to determine a shuffled global data index list.

It should be noted that, in this step, each training device holds the global data index list instead of only a local data index list corresponding to a dataset held by a training node. In addition, the n*m training nodes share the random number seed. This indicates that, for all the deployed training nodes, different training devices perform shuffling by using a same random number seed, to ensure that shuffled global data index lists have a same result.

Figure 4A:
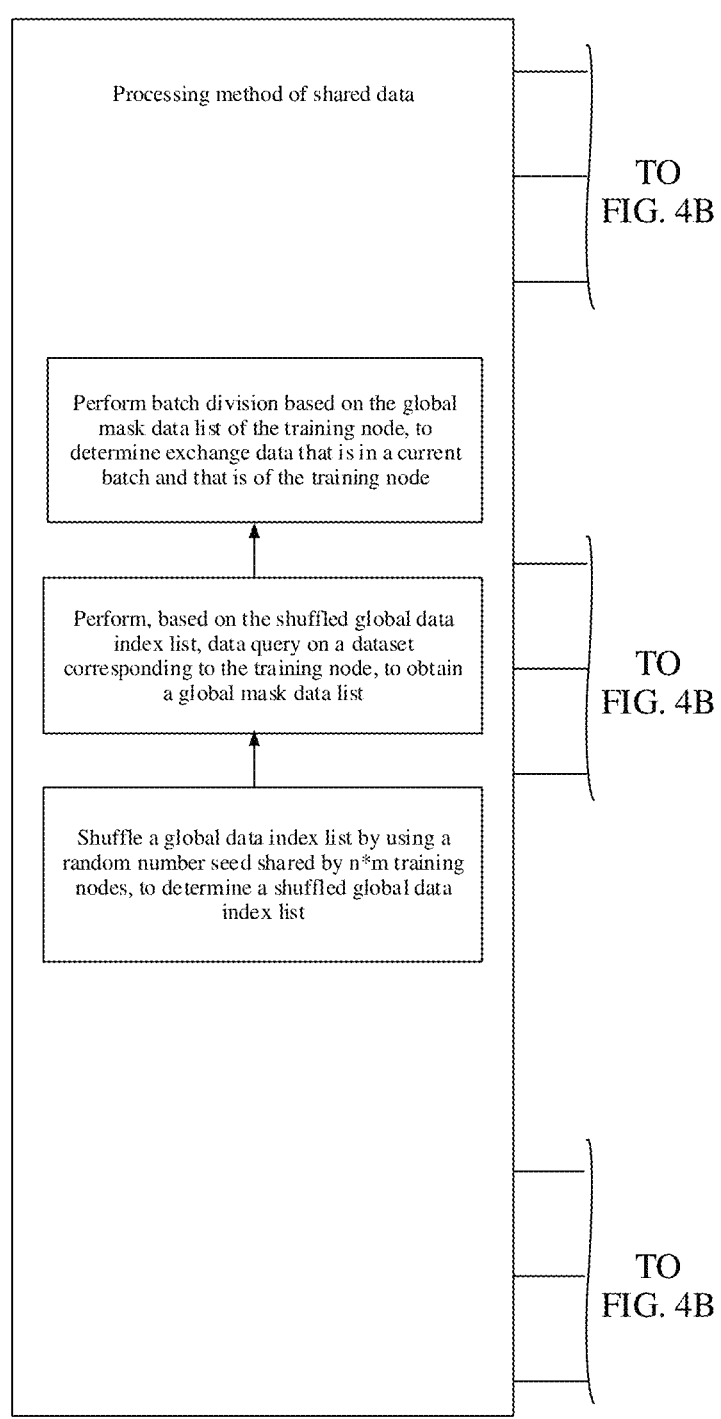
FIG. 4A and FIG. 4B are a diagram of a model training solution according to an embodiment of the present invention.
Figure 4B:
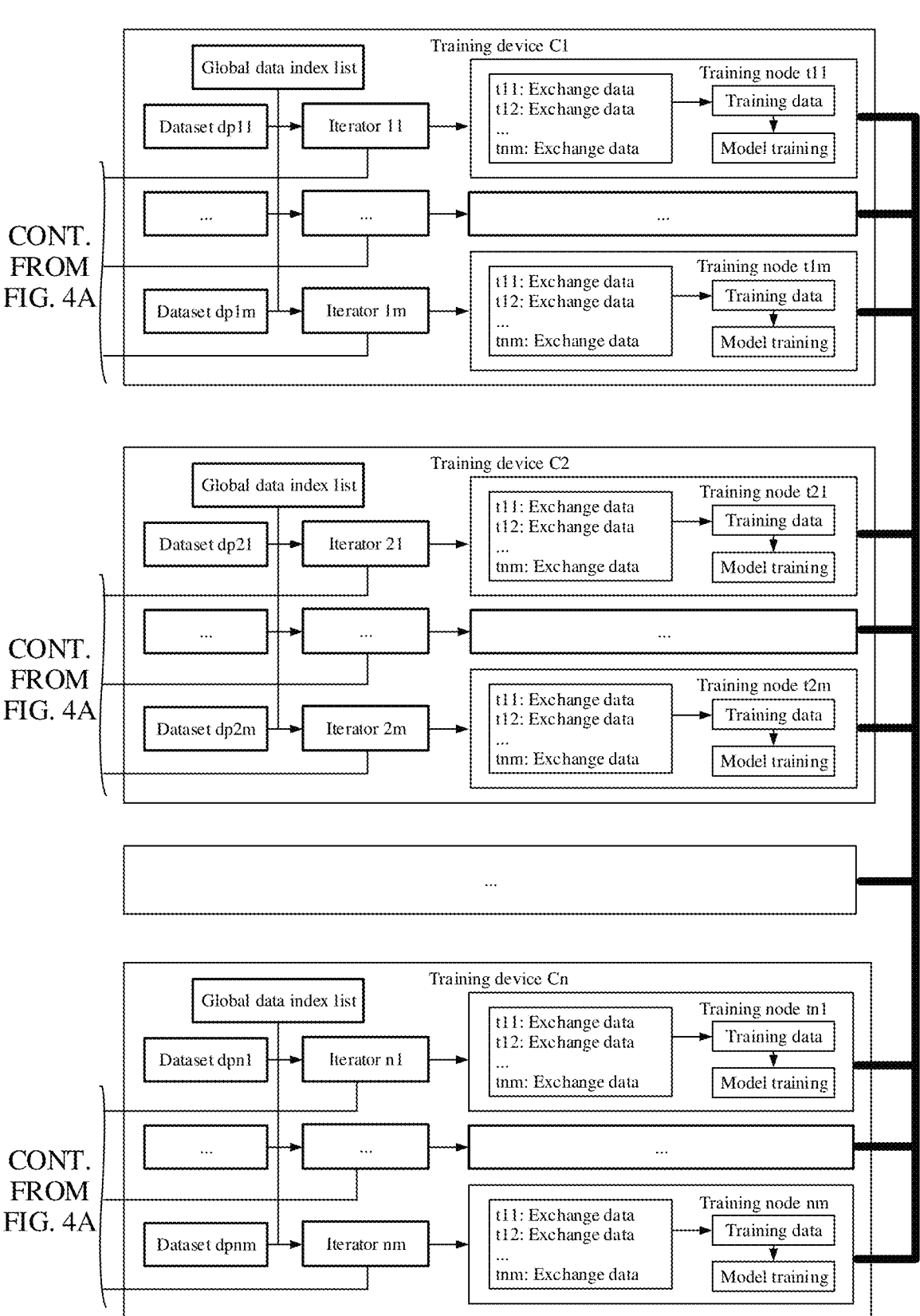
Figures 1, 5A:
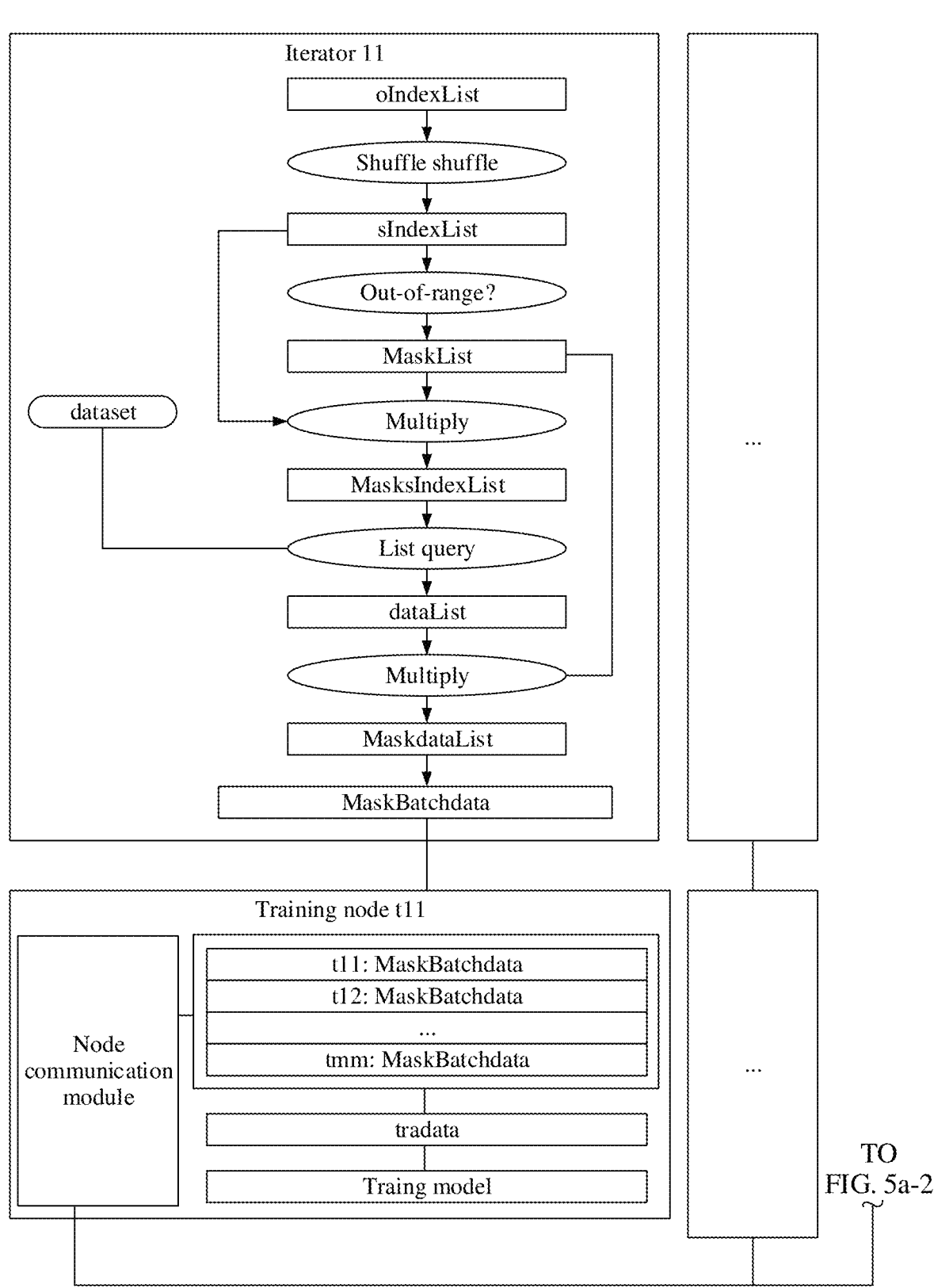

FIG. 5a-1 and FIG. 5a-2 are a schematic flowchart 1 of the model training solution provided in FIG. 4A and FIG. 4B. As shown in FIG. 5a-1 and FIG. 5a-2, the iterator 11 shuffles shuffles a global data index list oIndexList, to obtain a shuffled global data index list sIndexList. sIndexLists obtained by the iterator 11, . . . , and the iterator nm are the same, in other words, sIndexLists obtained by the training devices C1, . . . , and Cn are the same.

It should be noted that the global data index list indicates a fixed data sequence. To change the data sequence to fully learn a relationship between different data, the global data index list needs to be shuffled.

It should be noted that, in one round, batch iteration is implemented based on the shuffled global data index list. In addition, in a next round, the random number seed changes, and changed random number seeds of all training nodes are the same, so that the shuffled global data index list is shared again.

Step 13: For any node in the n*m training nodes, a training device in which the training node is located performs, based on the shuffled global data index list, data query on a dataset corresponding to the training node, to obtain a global mask data list.

In a feasible implementation, the iterator 11 traverses data index values in the shuffled global data index list sIndexList. For any data index value, if a dataset dp11 is not hit, padding_data is generated; otherwise, a piece of data is found. After the data index values are traversed, each data index value in the shuffled global data index list sIndexList is replaced with the found data or padding_data, to obtain the global mask data list. However, in this embodiment of the present invention, an ultra-large dataset needs to be applied, and there are a large quantity of training nodes. A data volume of a dataset corresponding to each training node is not large. If full query is performed, computing power is increased. Therefore, this implementation is applicable to a scenario in which a dataset is not extremely large.

In another feasible implementation, the iterator 11 traverses index values in the shuffled global data index list sIndexList. For any data index value, when the index value falls within a data index range of a dataset dp11, the index value is used to obtain real data as found data; otherwise, padding_data is generated. Each data index value in the shuffled global data index list sIndexList is replaced with the found data or padding_data, to obtain the global mask data list.

As shown in FIG. 5a-1 and FIG. 5a-2, the iterator 11 traverses the data index values in the shuffled global data index list sIndexList. When the index value falls within the data index range of the dataset dp11, it is considered that the index value does not exceed the range, and a valid value 1 is generated; otherwise, a mask value 0 is generated. After traversing is completed, the valid value 1 or the mask value 0 is sorted according to a sequence of the index values in the shuffled global data index list sIndexList, to obtain a mask list MaskList. Then, the mask list MaskList is multiplied by the shuffled global data index list sIndexList to obtain a mask global data index list MasksIndexList. Then, the dataset (the dataset dp11) is queried based on the mask global data index list MasksIndexList, and when the index value is 0, found data is "null"; otherwise, a piece of data in the dataset dp11 can be found, to obtain a global data list dataList corresponding to the mask global data index list MasksIndexList. Then, the global data list dataList is multiplied by the mask list MaskList to obtain the global mask data list MaskdataList.

It should be noted that, global mask data lists MaskdataLists obtained by the iterator 11, . . . , and the iterator nm indicate a same data sequence, that is, valid data corresponding to same locations in the global mask data lists MaskdataLists obtained by the iterator 11, . . . , and the iterator nm are the same.

FIG. 5b is a schematic flowchart 2 of the model training solution provided in FIG. 4A and FIG. 4B. As shown in FIG. 5b, if there are two training nodes t11 and t21, t11 is deployed on a training device C1, and t21 is deployed on a training device C2. If a global data index list oIndexList is [1, 2, 3, 4, 5, 6, 7, 8, 9, 10, 11, 12, 13, 14, 15, 16], a local data list dataset of the training node t11 is [A1, A2, A3, A4, A5, A6, A7, A8], and an index range is 1 to 8; and a local data list dataset of the training node t21 is [A9, A10, A11, A12, A13, A14, A15, A16], and an index range is 9 to 16. Although each of the two training nodes holds only eight pieces of data, both the two training nodes correspond to a full index list whose length is 16. It is assumed that a shuffled global data index list sIndexList is [13, 15, 2, 7, 4, 3, 10, 9, 11, 6, 12, 16, 1, 8, 5, 14].

For the training node t11, a mask list MaskList [0, 0, 1, 1, 1, 1, 0, 0, 0, 1, 0, 0, 1, 1, 1, 0] is generated based on whether a data index value in the sIndexList exceeds the data index range 1 to 8 of the dataset corresponding to the current node. The mask list MaskList is multiplied by the shuffled global data index list sIndexList, to obtain a mask global data index list MasksIndexList [0, 0, 2, 7, 4, 3, 0, 0, 0, 6, 0, 0, 0, 8, 5, 0]. The mask global data index list MasksIndexList is used to perform list query on the local data list dataset [A1, A2, A3, A4, A5, A6, A7, A8] to obtain a global data list dataList [X, X, A2, A7, A4, A3, X, X, X, A6, X, X, A1, A8, A5, X] (X is a value queried when the index is 0). Then, the global data list dataList [X, X, A2, A7, A4, A3, X, X, X, A6, X, X, A1, A8, A5, X] is multiplied by the mask list MaskList [0, 0, 1, 1, 1, 1, 0, 0, 0, 1, 0, 0, 1, 1, 1, 0] to obtain a global mask data list MaskdataList [0, 0, A2, A7, A4, A3, 0, 0, 0, A6, 0, 0, A1, A8, A5, 0].

For the training node t21, a mask list MaskList [1, 1, 0, 0, 0, 0, 1, 1, 1, 0, 1, 1, 0, 0, 0, 1] is generated based on whether a data index value in the sIndexList exceeds the data index range 9 to 16 of the dataset corresponding to the current node. The mask list MaskList is multiplied by the shuffled global data index list sIndexList, to obtain a mask global data index list MasksIndexList [13, 15, 0, 0, 0, 0, 10, 9, 11, 0, 12, 16, 0, 0, 0, 14]. The mask global data index list MasksIndexList is used to perform list query the local data list dataset [A9, A10, A11, A12, A13, A14, A15, A16] to obtain a global data list dataList [A13, A15, X, X, X, X, A10, A9, A11, X, A12, A16, X, X, X, A14] (X is a value queried when the index is 0). Then, the global data list dataList [A13, A15, X, X, X, X, A10, A9, A11, X, A12, A16, X, X, X, A14] is multiplied by the mask list MaskList [1, 1, 0, 0, 0, 0, 1, 1, 1, 0, 1, 1, 0, 0, 0, 1] to obtain a global mask data list MaskdataList [A13, A15, 0, 0, 0, 0, A10, A9, A11, 0, A12, A16, 0, 0, 0, A14].

Step 14: For any node in the n*m training nodes, a training device in which the training node is located performs batch division based on a global mask data list corresponding to the training node, to determine exchange data that is in a current batch and that corresponds to the training node.

After the global mask data list is obtained, a batch iterator is constructed, and the batch iterator is connected to the training node. The batch iterator constructs a batch based on a batch size, obtains different batches, and obtains, according to a sequence of batches of data output by the batch iterator, exchange data in a first batch, exchange data in a second batch, . . . , and the like. In actual application, the data currently output by the batch iterator is the exchange data in the current batch. Herein, i in an i$^{th}$ batch is a batch number.

As shown in FIG. 5b, for the training node t11, if the global mask data list MaskdataList of the training node t11 is [0, 0, A2, A7, A4, A3, 0, 0, 0, A6, 0, 0, A1, A8, A5, 0], and is input into the batch iterator, generated exchange data in the first batch is a data list [0, 0, A2, A7] in an exchange index list [13, 15, 2, 7], and correspondingly, exchange data in the second batch is a data list [A4, A3, 0, 0] in an exchange index list [4, 3, 10, 9], exchange data in a third batch is a data list [0, A6, 0, 0] in an exchange index list [11, 6, 12, 16], and exchange data in a fourth batch is a data list [A1, A8, A5, 0] in an exchange index list [1, 8, 5, 14].

For the training node t21, if the global mask data list MaskdataList of the training node t21 is [A13, A15, 0, 0, 0, 0, A10, A9, A11, 0, A12, A16, 0, 0, 0, A14], and is input into the batch iterator, generated exchange data in the first batch is a data list [A13, A15, 0, 0] in an exchange index list [13, 15, 2, 7], exchange data in the second batch is a data list [0, 0, A10, A9] in an exchange index list [4, 3, 10, 9], exchange data in a third batch is a data list [A11, 0, A12, A16] in an exchange index list [11, 6, 12, 16], and exchange data in a fourth batch is a data list [0, 0, 0, A14] in an exchange index list [1, 8, 5, 14].

Apparently, for batches with a same number, exchange index lists corresponding to the training node t11 and the training node t21 are the same. Data masked by the training node t11 in the batch is data that is not masked by the training node t21 in the batch, and data that is not masked by the training node t11 in the batch is data that is masked by the training node t21 in the batch. In actual application, all training nodes receive, at a same moment, exchange data of the batches with the same number.

Step 15: For any node in the $n*m$ training nodes, the training node obtains respective exchange data that is in a current batch and that is of other training nodes, and then performs convergence, to obtain global data in the current batch, and obtains training data of the training node based on the global data to perform model training.

Figures 1, 2, 5A:
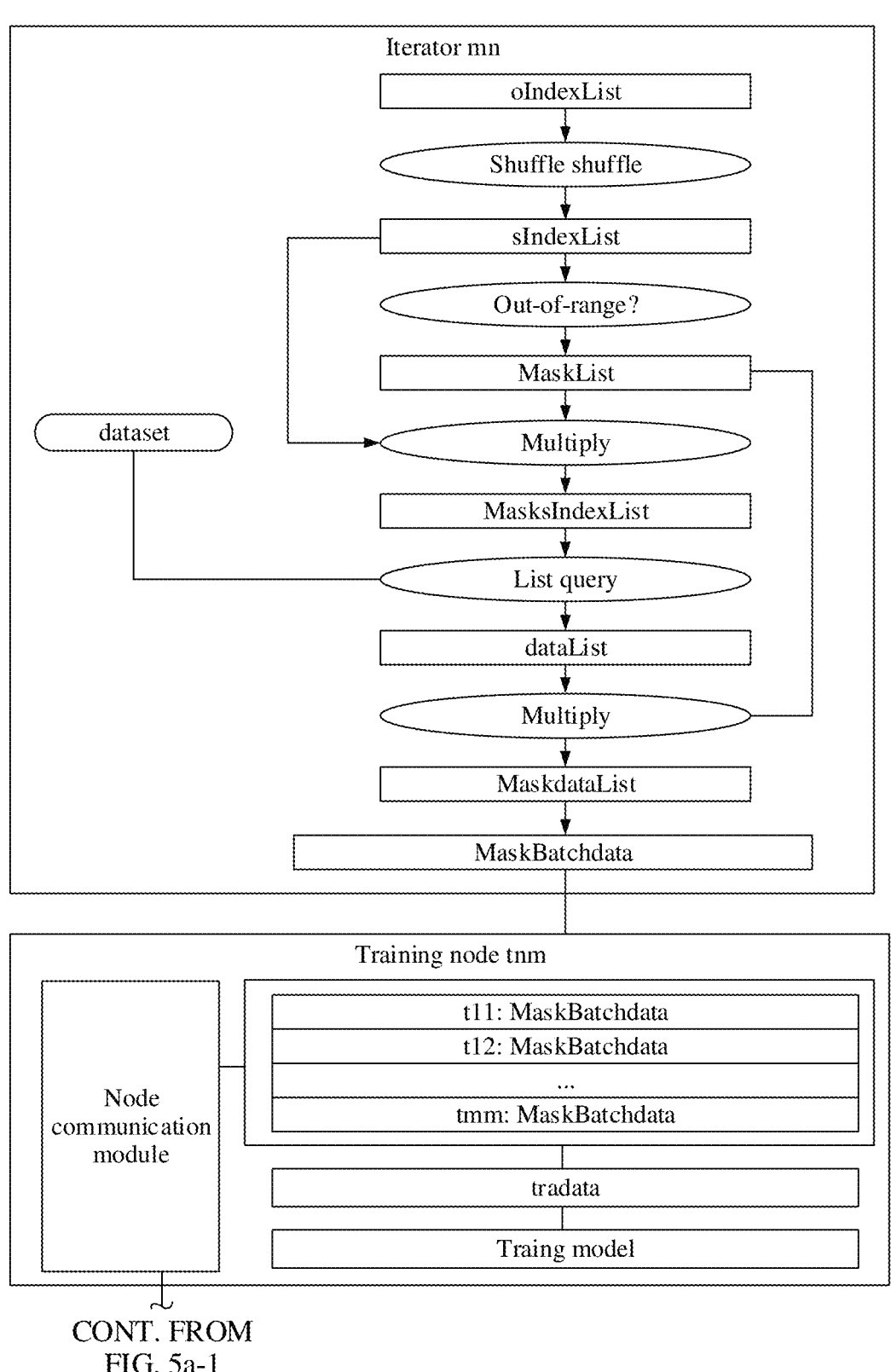

In a feasible implementation, as shown in FIG. 5$a$-1 and FIG. 5$a$-2, the training node t11 receives respective MaskdBatchData that is in the current batch and that is sent by t12, . . . , t1$m$, . . . , and tnm; and performs valid data convergence on respective MaskdBatchData that is in the current batch and that is of the $n*m$ training nodes t11, t12, . . . , t1$m$, . . . , and tnm, to obtain training data Tradata. Other training nodes are similar. Details are not described again. It should be understood that the respective exchange data MaskdBatchData that is in the current batch and that is of the training nodes t11, t12, . . . , t1$m$, . . . , and tnm complements to each other, so that each training node complements missing data in the current batch, to obtain training data of the training node, to implement model training. In actual application, the $n*m$ training nodes each have a node communication module. The node communication module is configured to implement ReduceScatter, where ReduceScatter refers to an aggregate communication operation. In the ReduceScatter operation, inputs of all training nodes are first summed, and then a summed input is split in a $0^{th}$ dimension based on a quantity of training nodes, and data is distributed to a corresponding training node.

As shown in FIG. 5$b$, if the exchange data in the current batch is exchange data in a first batch, for the training node t11, the exchange data MaskdBatchData in the current batch is [0, 0, A2, A7]; and for the training node t21, the exchange data MaskdBatchData in the current batch is [A13, A15, 0, 0]. Then, the training node t11 and the training node t21 perform ReduceScatter communications to exchange valid data. In this case, the training node t11 performs a ReduceScatter operation to obtain unmasked data [A13, A15] of the training node t21, and performs model training based on training data Tradata [A13, A15], and the training node t21 performs a ReduceScatter operation to obtain unmasked data [A2, A7] of the training node t11, and performs model training based on training data Tradata [A2, A7]. In some possible implementations, the training node t11 and the training node t21 perform model training based on same training data. For example, the training node t11 and the training node t21 separately perform model training based on training data Tradata [A13, A15, A2, A7].

In a feasible implementation, the training node t11 sends the exchange data in the current batch to a specified training node. It is assumed that the node is the training node t12. The training node t12 performs valid data convergence based on the respective exchange data MaskdBatchData that is in the current batch and that is of the $n*m$ training nodes t11, t12, . . . , t1$m$, . . . , and tnm, to obtain training data Tradata, and sends the training data Tradata to training nodes other than the training node t12, so that the $n*m$ training nodes t11, t12, . . . , t1$m$, . . . , and tnm separately perform model training based on the received training data Tradata.

For the foregoing technical solution, in this embodiment of the present invention, the global dataset is considered as the global data index list distributed on all the training nodes, a list query out-of-range part is masked in a distributed query manner, and masked data is finally eliminated through communication. In this way, the global data that is in the batch and that is finally obtained by all the training nodes is the same, and the data that is of each training node and that is used for model training is obtained based on the global data. In other words, in this embodiment of the present invention, all the training nodes exchange the hit data in the exchange data, so that each training node eliminates the mask data in the exchange data of the training node, and performs model training based on the obtained training data of the training node, thereby implementing partial storage global data training.

The foregoing describes the model training solution provided in this solution. The following describes another model training solution provided in this solution based on some or all content described above and a schematic diagram of another model training solution provided in an embodiment of the present invention shown in FIG. 6A and FIG. 6B. It should be noted that a main application scenario of the model training solution is: Data in a global dataset is not independent of each other, and an index value in a global index list is used to query one batch in the global dataset. Herein, for ease of description and differentiation, the global index list is referred to as a global batch index list, and the index value is referred to as a batch index value. Details are shown in the following descriptions.

Step 21: Each of the n training devices stores a global batch index list and datasets respectively corresponding to a plurality of deployed training nodes, where the global data index list is used to hit datasets respectively corresponding to $n*m$ training nodes, and the datasets respectively corresponding to the $n*m$ training nodes are obtained by performing $n*m$ equal division on one global dataset.

Step 22: For any node in the $n*m$ training nodes, a training device in which the training node is located performs shuffling on a global batch index list by using a random number seed shared by the $n*m$ training nodes, to determine a shuffled global batch index list.

It should be noted that, in this step, each training device holds the global batch index list instead of only a batch index list corresponding to a dataset held by a training node. In addition, for all the deployed training nodes, different training devices perform shuffling by using a same random number seed, to ensure that shuffled global batch index lists have a same result.

If a batch size is N, the n*m training nodes t11, t12, . . . , t1m, . . . , and tnm each have N batch index values, and different training nodes have different batch index values. In this case, a quantity of batch index values in the global batch index list is N*n*m.

Figure 6A:
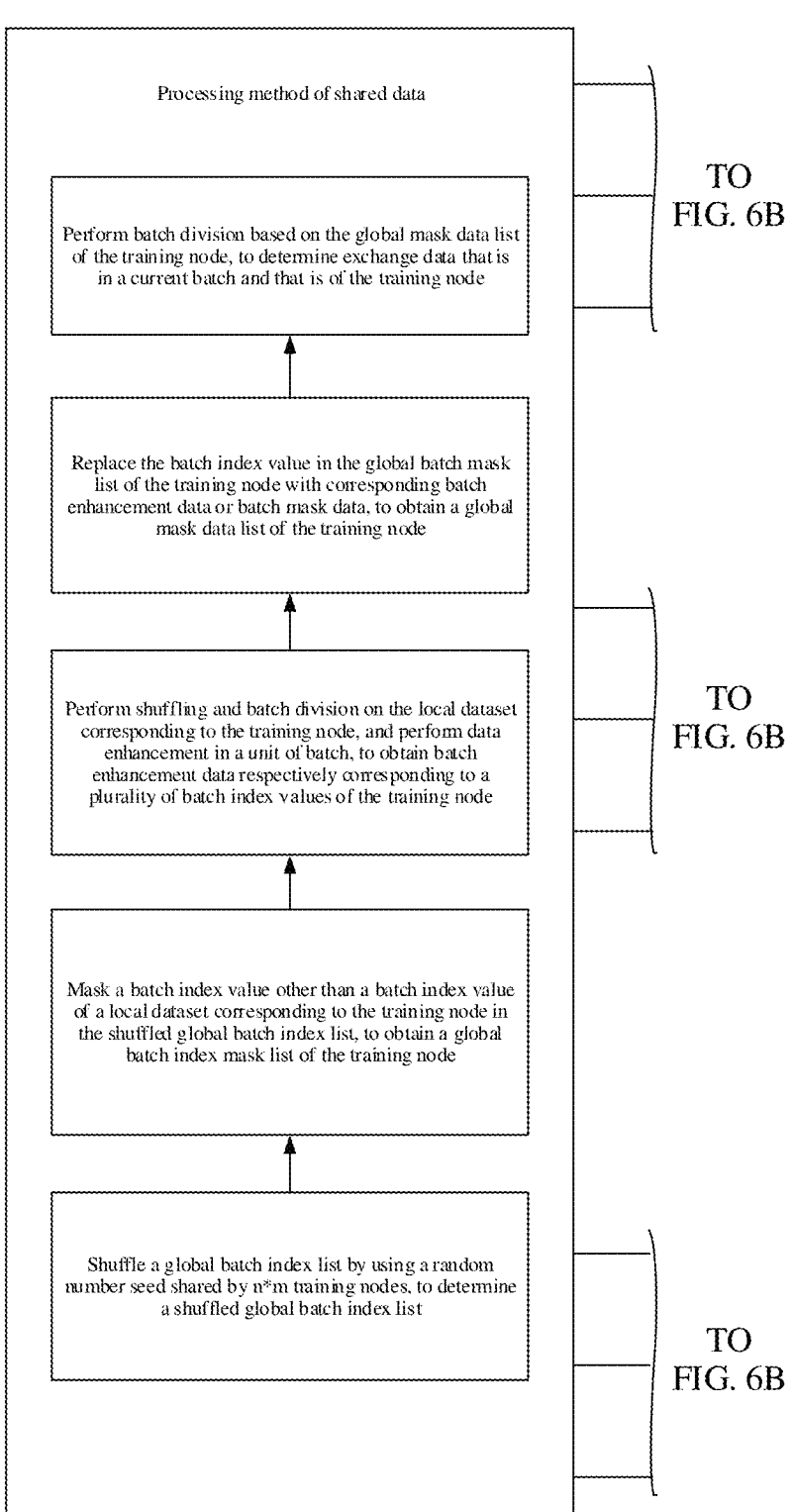
FIG. 6A and FIG. 6B are a diagram of another model training solution according to an embodiment of the present invention.
Figure 6B:
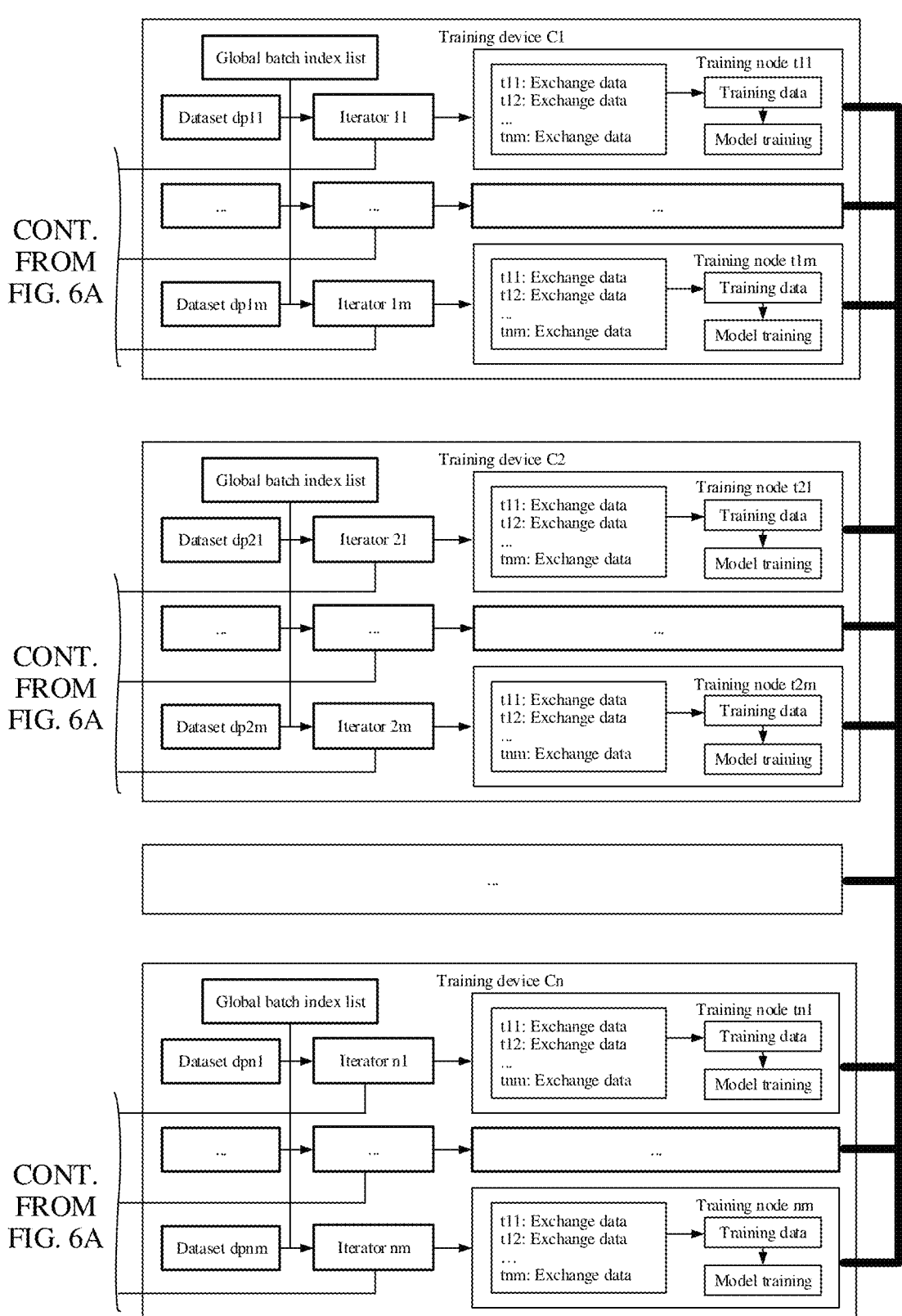
Figures 1, 7A:
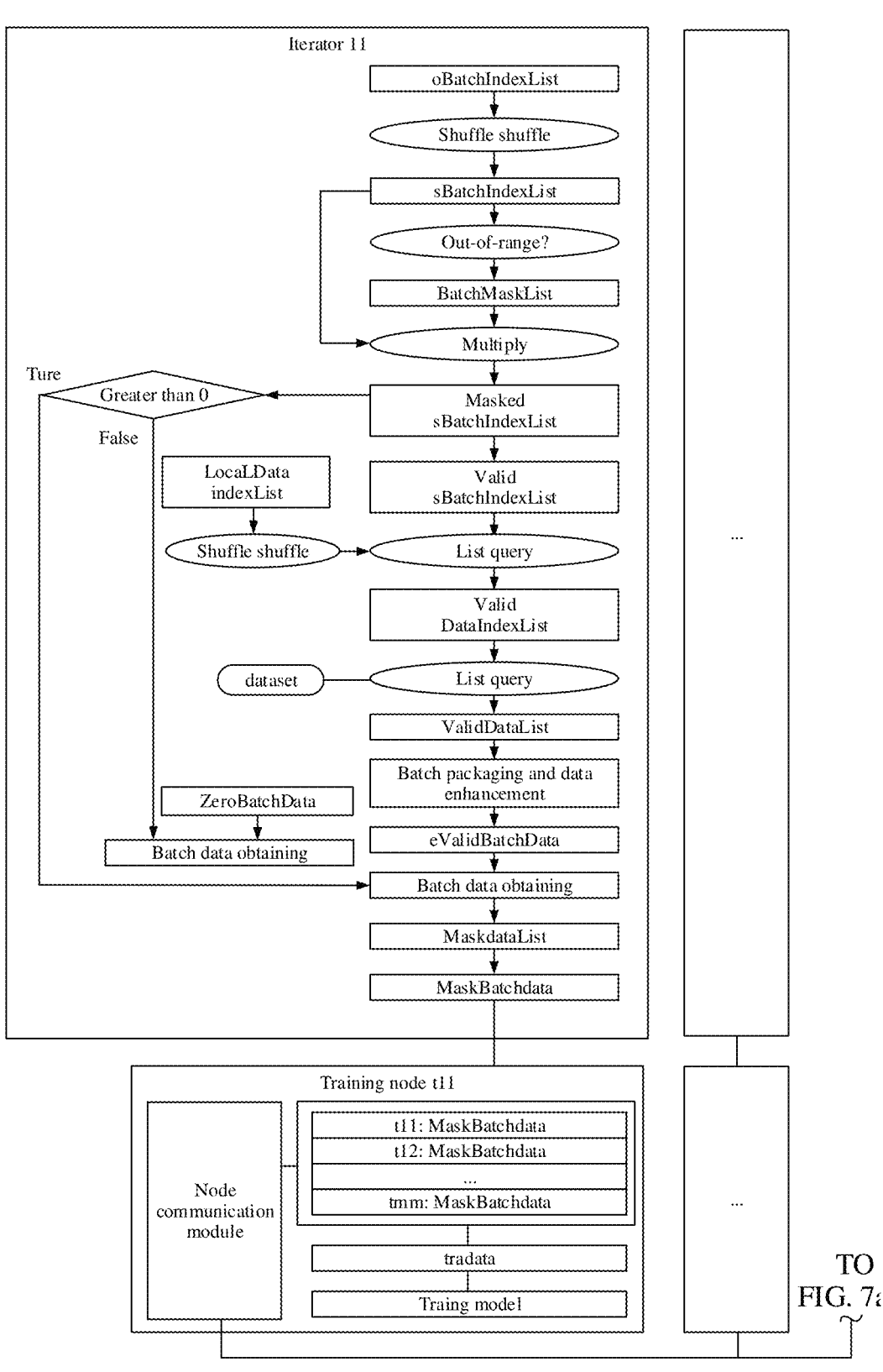
Figures 1, 2, 7A:
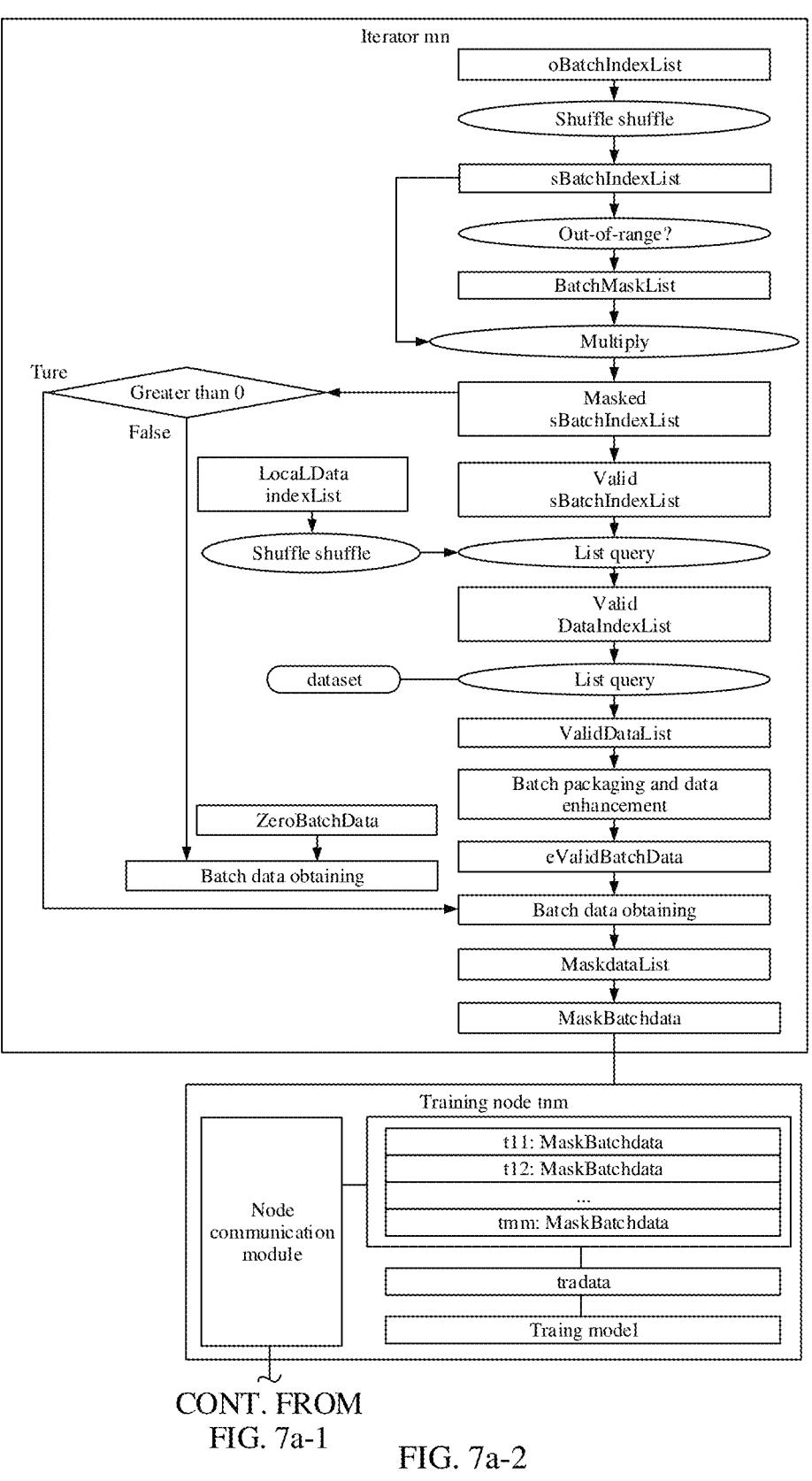
Figure 7B:
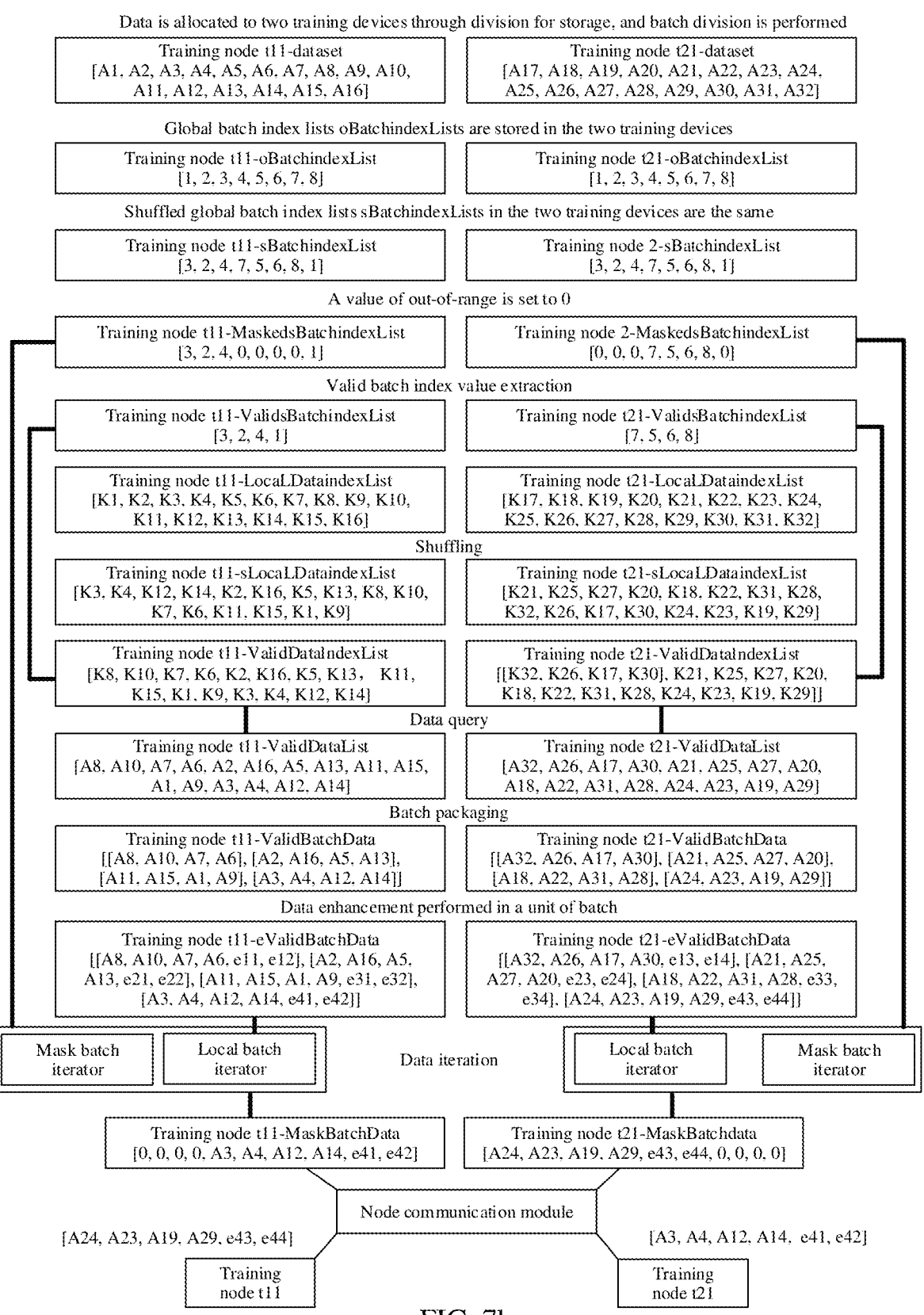
FIG. 7*b* is a schematic flowchart 1 of the another model training solution according to FIG. 6A and FIG. 6B.

FIG. 7b is a schematic flowchart 1 of the another model training solution provided in FIG. 6A and FIG. 6B. As shown in FIG. 7b, if there are two training nodes t11 and t21, t11 is deployed on a training device C1, and t21 is deployed on a training device C2. Each training node has 16 pieces of data, and a batch size is 4. In this case, the global batch index list is [1, 2, 3, 4, 5, 6, 7, 8]. A local batch index list of the training node t11 is [1, 2, 3, 4], and a batch index range is 1 to 4; and a local batch index list of the training node t11 is [5, 6, 7, 8], and a batch index range is 5 to 8.

It should be noted that, in one round, batch iteration is implemented based on the shuffled global batch index list. In addition, in a next round, the random number seed changes, and changed random number seeds of all training nodes are the same, so that the shuffled global batch index list is shared again.

Step 23: For any node in the n*m training nodes, a training device in which the training node is located masks a batch index value other than a batch index value of a dataset that corresponds to the training node and that is in the shuffled global batch index list, to obtain a masked global batch index list.

In a feasible implementation, batch index values in the shuffled global batch index list sBatchIndexList are traversed. For any batch index value, when the batch index value falls within a batch index range of the dataset corresponding to the training node, the batch index value is reserved; otherwise, padding_data is generated. After each batch index value in the shuffled global batch index list sBatchIndexList is processed, the masked global batch index list MaskedsBatchIndexList is obtained.

FIG. 7a-1 and FIG. 7a-2 are a schematic flowchart 1 of the another model training solution provided in FIG. 6A and FIG. 6B. As shown in FIG. 7a-1 and FIG. 7a-2, in actual application, batch index values in the shuffled global batch index list sBatchIndexList are traversed. After traversing is completed, a batch mask list BatchMaskList is obtained. When the batch index value falls within a batch index range of a dataset corresponding to a training node, it is considered that the index value does not exceed the range, and a valid value 1 is generated; otherwise, a mask value 0 is generated. Then, the batch mask list BatchMaskList is multiplied by the shuffled global batch index list sBatchIndexList to obtain a masked global batch index list MaskedsBatchIndexList.

As shown in FIG. 7b, it is assumed that the shuffled global batch index list sBatchIndexList is [3, 2, 4, 7, 5, 6, 8, 1].

For the training node t11, a batch mask list BatchMaskList [1, 1, 0, 0, 0, 1] is generated based on whether a batch index value exceeds a batch index range 1 to 4 of the node, and is multiplied by the shuffled global batch index list sBatchIndexList to obtain a masked global batch index list MaskedsBatchIndexList [3, 2, 4, 0, 0, 0, 0, 1].

For the training node t21, a batch mask list BatchMaskList [0, 0, 0, 1, 1, 1, 1, 0] is generated based on whether a batch index value exceeds a batch index range 5 to 8 of the node, and is multiplied by the shuffled global batch index list sBatchIndexList to obtain a masked global batch index list MaskedsBatchIndexList [0, 0, 0, 7, 5, 6, 8, 0].

Step 24: For any node in the n*m training nodes, a training device in which the training node is located performs shuffling and batch division on a dataset corresponding to the training node, and performs data enhancement in a unit of batch, to obtain enhanced batch data respectively corresponding to a plurality of batch index values of the training node.

In this embodiment of the present invention, enhanced batch data or padding_Batch_data (mask batch data) is generated in the unit of batch, so that data enhancement effect in the batch is not affected by a mask. It should be noted that, in this embodiment of the present invention, a locally stored dataset is shuffled. In this way, both the global batch index list and the local data are shuffled. Through two-level shuffling, the data sequence is fully disordered, data distribution is changed, and a data reference value is improved.

As shown in FIG. 7a-1 and FIG. 7a-2, for the iterator 11, according to a feasible implementation, a valid value is extracted from the masked global batch index list MaskedsBatchIndexList to obtain a valid batch index list ValidsBatchIndexList. Then, a local data index list LocalDataindexList of a dataset dp11 is shuffled, and batch division is performed on a shuffled local data index list to obtain respective shuffled batch data index lists of a plurality of batch index values. Then, a batch index value in the valid batch index list ValidsBatchIndexList is replaced with a corresponding shuffled batch data index list, to obtain a valid data index list ValidDataIndexList. Then, data query is performed on the dataset dp11 based on the valid data index list ValidDataIndexList, to obtain a valid data list ValidDataList. Then, data enhancement is performed on the valid data list ValidDataList in a unit of batch, to obtain enhanced valid batch data e ValidBatchData.

As shown in FIG. 7b, it is assumed that the training node t11 holds a data list dataset [A1, A2, A3, A4, A5, A6, A7, A8, A9, A10, A11, A12, A13, A14, A15, A16], a global batch index list sBatchIndexList [1, 2, 3, 4, 5, 6, 7, 8], a local batch index list [1, 2, 3, 4], and a batch data index list [[K1, K2, K3, K4], [K5, K6, K7, K8], [K9, K10, K11, K12], [K13, K14, K15, K16]]. Herein, Ki may be used to find Ai, where i=1, 2, . . . , 16.

For the training node t11, a local data list dataset [A1, A2, A3, A4, A5, A6, A7, A8, A9, A10, A11, A12, A13, A14, A15, A16] may be used to generate a local data index list LocalDataindexList [K1, K2, K3, K4, K5, K6, K7, K8, K9, K10, K11, K12, K13, K14, K15, K16], and shuffling is performed on the local data index list LocalDataindexList [K1, K2, K3, K4, K5, K6, K7, K8, K9, K10, K11, K12, K13, K14, K15, K16] to obtain a shuffled local data index list sLocalDataindexList [K3, K4, K12, K14, K2, K16, K5, K13, K8, K10, K7, K6, K11, K15, K1, K9]. Herein, a shuffled batch data index list corresponding to a batch index value 1 is [K3, K4, K12, K14], a shuffled batch data index list corresponding to a batch index value 2 is [K2, K16, K5, K13], a shuffle batch data index list corresponding to a batch index value 3 is [K2, K8, K10, K7, K6], and a shuffle batch data index list corresponding to a batch index value 4 is [K3, K11, K15, K1, K9].

A masked global batch index list MaskedsBatchIndexList [3, 2, 4, 0, 0, 0, 0, 1] is used to obtain a valid batch index list ValidsBatchIndexList [3, 2, 4, 1]. List query is performed on a shuffled batch data index list corresponding to [1, 2, 3, 4] based on the ValidsBatchIndexList to obtain a valid data index list ValiddataIndexList [K8, K10, K7, K6, K2, K16, K5, K13, K11, K15, K1, K9, K3, K4, K12, K14]. List query is performed on a dataset based on the valid data index list ValidDataIndexList to obtain a valid data list ValidDataList [A8, A10, A7, A6, A2, A16, A5, A13, A11, A15, A1, A9, A3, A4, A12, A14].

Then, batch packaging is performed on the valid data list ValidDataList to perform data enhancement in a unit of batch, to obtain enhanced valid batch data e ValidBatchData [[A8, A10, A7, A6, e11, e12], [A2, A16, A5, A13, e21, e22], [A11, A15, A1, A9, e31, e32], [A3, A4, A12, A14, e41, e42]], and the enhanced valid batch data e ValidBatchData [[A8, A10, A7, A6, e11, e12], [A2, A16, A5, A13, e21, e22], [A11, A15, A1, A9, e31, e32], [A3, A4, A12, A14, e41, e42]] corresponds to ValidsBatchIndexList [3, 2, 4, 1]. In this case, enhanced batch data of the batch index value 3 is [A8, A10, A7, A6, e11, e12], and enhanced batch data of the batch index value 2 is [A2, A16, A5, A13, e21, e22]. The rest may be deduced by analogy, and details are not described again.

For the training node t21, there is a local data list dataset [A17, A18, A19, A20, A21, A22, A23, A24, A25, A26, A27, A28, A29, A30, A31, A32], a global batch index list sBatchIndexList [1, 2, 3, 4, 5, 6, 7, 8], a local batch index list [5, 6, 7, 8], and a local batch index list [5, 6, 7, 8]. A corresponding batch data index list is [[K17, K18, K19, K20], [K21, K22, K23, K24], [K25, K26, K27, K28], [K29, K30, K31, K32]]. Herein, Ki may be used to find Ai, where i=17, 18, . . . , 32.

For the training node t21, a local data list dataset [A17, A18, A19, A20, A21, A22, A23, A24, A25, A26, A27, A28, A29, A30, A31, A32] may be used to generate a local data index list LocalDataindexList [K17, K18, K19, K20, K21, K22, K23, K24, K25, K26, K27, K28, K29, K30, K31, K32], and shuffling is performed on the local data index list LocalDataindexList [K17, K18, K19, K20, K21, K22, K23, K24, K25, K26, K27, K28, K29, K30, K31, K32] to obtain a shuffled local data index list sLocalDataindexList [K21, K25, K27, K20, K18, K22, K31, K28, K32, K26, K17, K30, K24, K23, K19, K29]. A shuffled batch data index list corresponding to a batch index value 5 is [K21, K25, K27, K20], a shuffled batch data index list corresponding to a batch index value 6 is [K18, K22, K31, K28], a shuffle batch data index list corresponding to a batch index value 7 is [K32, K26, K17, K30], and a shuffle batch data index list corresponding to a batch index value 8 is [K24, K23, K19, K29].

A masked global batch index list MaskedsBatchIndexList [0, 0, 0, 7, 5, 6, 8, 0] is used to obtain a valid batch index list ValidsBatchIndexList [7, 5, 6, 8]. List query is performed on a shuffled batch data index list corresponding to [7, 5, 6, 8] based on the ValidsBatchIndexList to obtain a valid data index list ValidDataIndexList [K32, K26, K17, K30, K21, K25, K27, K20, K18, K22, K31, K28, K24, K23, K19, K29]. List query is performed on a dataset based on the valid data index list ValidDataIndexList to obtain a valid data list ValidDataList [A32, A26, A17, A30, A21, A25, A27, A20, A18, A22, A31, A28, A24, A23, A19, A29].

Then, batch packaging is performed on the valid data list ValidDataList to perform data enhancement in a unit of batch, to obtain enhanced valid batch data eValidBatchData [[A32, A26, A17, A30, e13, e14], [A21, A25, A27, A20, e23, e24], [A18, A22, A31, A28, e33, e34], [A24, A23, A19, A29, e43, e44]], and the enhanced valid batch data e ValidBatchData [[A32, A26, A17, A30, e13, e14], [A21, A25, A27, A20, e23, e24], [A18, A22, A31, A28, e33, e34], [A24, A23, A19, A29, e43, e44]] corresponds to a valid batch index list ValidsBatchIndexList [7, 5, 6, 8]. In this case, enhanced batch data of the batch index value 7 is [A32, A26, A17, A30, e13, e14]. The rest may be deduced by analogy, and details are not described again.

Step 25: For any node in the n*m training nodes, a training device in which the training node is located replaces a batch index value in a masked global batch index list corresponding to the training node with corresponding enhanced batch data or mask batch data, to obtain a global mask data list corresponding to the training node.

An unmasked batch index value in a masked global batch index list MaskedsBatchIndexList is replaced with corresponding enhanced batch data, and a masked batch index value is replaced with corresponding mask batch data, to determine a global mask data list MaskdataList. Herein, a quantity of mask values in the mask batch data is the same as a quantity of pieces of data in the enhanced batch data.

For the training node t11, if a masked global batch index list MaskedsBatchIndexList is [3, 2, 4, 0, 0, 0, 1], enhanced valid batch data e ValidBatchData is [[A8, A10, A7, A6, e11, e12], [A2, A16, A5, A13, e21, e22], [A11, A15, A1, A9, e31, e32], [A3, A4, A12, A14, e41, e42]], and corresponds to [3, 2, 4, 1], and mask batch data is [0, 0, 0, 0, 0, 0], generated final global mask data list MaskdataList is [[A8, A10, A7, A6, e11, e12], [A2, A16, A5, A13, e21, e22], [A11, A15, A1, A9, e31, e32], [0, 0, 0, 0, 0, 0], [0, 0, 0, 0, 0, 0], [0, 0, 0, 0, 0, 0], [A3, A4, A12, A14], e41, e42]].

For the training node t21, if a masked global batch index list MaskedsBatchIndexList is [0, 0, 0, 7, 5, 6, 8, 0], enhanced valid batch data e ValidBatchData is [[A32, A26, A17, A30, e13, e14], [A21, A25, A27, A20, e23, e24], [A18, A22, A31, A28, e33, e34], [A24, A23, A19, A29, e43, e44]], and corresponds to [7, 5, 6, 8], and mask batch data is [0, 0, 0, 0, 0, 0], generated final global mask data list MaskdataList is [[0, 0, 0, 0, 0, 0], [0, 0, 0, 0, 0, 0], [0, 0, 0, 0, 0, 0], [A32, A26, A17, A30, e13, e14], [A21, A25, A27, A20, e23, e24], [A18, A22, A31, A28, e33, e34], [A24, A23, A19, A29, e43, e44], [0, 0, 0, 0, 0, 0]].

Step 26: For any node in the n*m training nodes, a training device in which the training node is located performs batch division based on a global mask data list corresponding to the training node, to determine exchange data that is in a current batch and that corresponds to the training node.

After the global mask data list is obtained, a batch iterator is constructed, and the batch iterator is connected to the training node. The batch iterator constructs a batch based on a batch size, obtains different batches, and obtains, according to a sequence of batches of data output by the batch iterator, exchange data in a first batch, exchange data in a second batch, . . . , and the like. In actual application, the data currently output by the batch iterator is the exchange data in the current batch. Herein, i in an $i^{th}$ batch is a batch number.

As shown in FIG. 7b, for the training node t11, exchange data that is in a first batch and that is generated by the training node t11 is a data list [A8, A10, A7, A6, e11, e12, A2, A16, A5, A13, e21, e22] of an exchange index list [3, 2], exchange data that is in a second batch and that is generated by the training node t11 is a data list [A11, A15, A1, A9, e31, e32, 0, 0, 0, 0, 0, 0] of an exchange index list [4, 7], exchange data that is in a third batch and that is generated by the training node t11 is a data list [0, 0, 0, 0, 0, 0, 0, 0, 0, 0, 0, 0] of an exchange index list [5, 6], and exchange data that is in a fourth batch and that is generated by the training node t11 is a data list [0, 0, 0, 0, 0, 0, A3, A4, A12, A14, e41, e42] of an exchange index list [8, 1].

For the training node t21, exchange data that is in a first batch and that is generated by the training node t21 is a data list [0, 0, 0, 0, 0, 0, 0, 0, 0, 0, 0, 0] of an exchange index list [3, 2], exchange data that is in a second batch and that is generated by the training node t21 is a data list [0, 0, 0, 0, 0, 0, A32, A26, A17, A30, e13, e14] of an exchange index list [4, 7], exchange data that is in a third batch and that is generated by the training node t21 is a data list [A21, A25, A27, A20, e23, e24, A18, A22, A31, A28, e33, e34] of an exchange index list [5, 6], and exchange data that is in a fourth batch and that is generated by the training node t21 is a data list [A24, A23, A19, A29, e43, e44, 0, 0, 0, 0, 0, 0] of an exchange index list [8, 1].

Apparently, for batches with a same number, exchange index lists corresponding to the training node t11 and the training node t21 are the same. Data in one batch masked by the training node t11 in the batch is data in one batch that is not masked by the training node t21 in the batch, and data in one batch that is not masked by the training node t11 in the batch is data in one batch that is masked by the training node t21 in the batch. In actual application, all training nodes receive, at a same moment, exchange data of the batches with the same number.

Step 27: For any node in the n*m training nodes, the training node obtains respective exchange data that is in a current batch and that is of other training nodes, and then performs convergence, to obtain global data in the current batch, and obtains training data of the training node based on the global data to perform model training.

In a feasible implementation, as shown in FIG. 7a-1 and FIG. 7a-2, the training node t11 receives respective Maskd-BatchData that is in the current batch and that is sent by t12, . . . , t1m, . . . , and tnm; and performs valid data convergence on respective MaskdBatchData that is in the current batch and that is of the n*m training nodes t11, t12, . . . , t1m, . . . , and tnm, to obtain training data Tradata. Other training nodes are similar. Details are not described again. It should be understood that the respective exchange data MaskdBatchData that is in the current batch and that is of the training nodes t11, t12, . . . , t1m, . . . , and tnm complements to each other, so that each training node complements missing data in the current batch, to obtain training data of the training node, to implement model training. In actual application, the n*m training nodes each have a node communication module. For content of the node communication module, refer to the foregoing descriptions. Details are not described again.

As shown in FIG. 7b, if the current batch is the fourth batch, for the training node t11, exchange data of the current batch is [0, 0, 0, 0, 0, 0, A3, A4, A12, A14, e41, e42]; and for the training node t21, exchange data of the current batch is [A24, A23, A19, A29, e43, e44, 0, 0, 0, 0, 0, 0]. Then, the training node t11 and the training node t21 perform Reduc-eScatter communications to exchange data, and separately eliminate mask data. In this case, the training node t11 performs a ReduceScatter operation to obtain unmasked data [A24, A23, A19, A29, e43, e44] of the training node t21, and performs model training based on training data Tradata [A24, A23, A19, A29, e43, e44]. The training node t21 performs a ReduceScatter operation to obtain unmasked data [A3, A4, A12, A14, e41, e42] of the training node t11, and performs model training based on training data Tradata [A3, A4, A12, A14, e41, e42]. In some possible implementations, the training node t11 and the training node t21 perform model training based on same training data. For example, the training node t11 and the training node t21 separately perform model training based on training data Tradata [A24, A23, A19, A29, e43, e44, A13, A15, A3, A4, A12, A14, e41, e42].

In this embodiment of the present invention, enhanced batch data and mask batch data are generated in the unit of batch, so that data enhancement effect in a batch is not affected by a mask. It should be noted that, in this embodiment of the present invention, local dataset shuffling and batch shuffling are performed on the dataset that is stored in a distributed manner, to implement two-level shuffling of the dataset, so as to achieve full shuffling effect. Therefore, data distribution is changed and that a model can fully learn a relationship between different data is ensured.

The following describes, based on the model training solution described above, a model training method provided in this embodiment of the present invention. It may be understood that the method is another expression manner of the model training solution described above, and the method and the model training solution are combined. The method is proposed based on the model training solution described above. For some or all content of the method, refer to the foregoing descriptions of the model training solution.

FIG. 8 is a schematic flowchart of a model training method according to an embodiment of the present invention. It may be understood that the method may be performed by using a single training device. The training device is any training device in n training devices, a total of M training nodes are deployed in the n training devices, the training device stores a global index list and a dataset corresponding to a training node deployed in the training device, the global index list indicates at least an index of data in the dataset corresponding to the deployed training node, n is a positive integer greater than or equal to 1, and M is a positive integer greater than or equal to n.

In this solution, a global dataset is divided in a unit of training node, the global dataset is allocated to all training nodes through division, and is stored, in a distributed manner, in all training devices in which all the training nodes are located. In addition, all the training nodes share a global index list of the global dataset, and store the global index list to all the training devices in which all the training nodes are located, to process a distributed dataset from a global perspective. Herein, each piece of data in the global dataset may be understood as a sample, and a quantity of pieces of data indicates a quantity of samples. Herein, an ultra-large dataset is divided, and each training node holds a part of the dataset, to store the ultra-large dataset in a distributed manner. In addition, a data processing operation is performed, from a global perspective, on a dataset stored in a training device, so that effect same as that of operating a full dataset by the training node can be ensured.

In a feasible implementation, the global index list indicates indexes of data in datasets respectively corresponding to the M training nodes.

In an example, the global index list is a global data index list, and each index value in the list is used to query a piece of data in a dataset corresponding to any training node, that is, a sample. In this way, a quantity of index values in the global index list is a quantity of pieces of data in the dataset corresponding to each of the M training nodes, that is, a quantity of samples.

In an example, the global index list is a global batch index list, and each index value in the list is used to query data that is in one batch and that is in a dataset corresponding to any training node. Herein, index values in the global index list include several batch index values of each of the M training nodes, and a quantity of index values is a sum of quantities of batch index values of the M training nodes.

It should be noted that, if data processing needs to be performed on the dataset to change data content and a data volume, data obtained after data processing may be found based on the index values in the global index list.

In a feasible implementation, if each piece of data in the dataset is independent, the global index list may be a global data index list. When data processing needs to be performed to change data content and/or a data volume, each index value in the global index list is used to query a piece of data in a dataset corresponding to any training node and data obtained after data processing is performed on the piece of data.

In a feasible implementation, if the data in the dataset is related to each other and convergence processing such as data enhancement needs to be performed, the global index list may be a global batch index list, and each index value in the list is used to query data that is in one batch and that is in a dataset corresponding to any training node and data obtained after data processing is performed on the data in the batch, for example, the enhanced batch data.

Herein, the n training devices form the model training system 100. For details, refer to the foregoing descriptions. Details are not described again.

As shown in FIG. 8, the model training method includes the following steps.

Step 801: Shuffle the global index list by using a random number seed, and perform, based on a shuffled list, data query on the dataset stored in the training device, to obtain exchange data corresponding to the training node deployed in the training device, where the exchange data is hit data obtained through data query.

In a feasible implementation, in a current round in a plurality of rounds of iteration processes, the global index list is shuffled by using the random number seed, and data query and batch division are performed, based on the shuffled list, on the dataset stored in the training device, to obtain exchange data of the training node deployed in the training device in a current batch in a batch iteration process.

Shuffled lists respectively in a plurality of rounds are different, so that data in the dataset is fully shuffled, data distribution is changed, and a data reference value is ensured. Therefore, a model can fully learn a relationship between different data. Herein, the current batch is any batch in a plurality of batches in the current round, and is a batch in a current time period.

In this solution, since a data sequence indicated by the global index list is fixed, the relationship between the data is disturbed to change data distribution in one round, and data distribution in different rounds is different. In this way, the data reference value is improved, and model training effect is ensured. To ensure that all training nodes know a same data sequence, a unified random number seed (that is, a random number seed shared by all the training nodes) needs to be used to shuffle the global index list, so that all the training nodes share a shuffled global index list.

Batch division is performed based on a sequence of indexes indicated by the shuffled list, and the sequence of the indexes indicates a data sequence. In actual application, the essence of batch division may be understood as: slicing the shuffled list to obtain an exchange index list in the current batch, and performing data query on the stored dataset based on the exchange index list, to obtain the exchange data of the deployed training node. The exchange data essentially reflects query of the exchange index list for the dataset.

Correspondingly, the exchange data includes the hit data obtained through data query, and may further include mask data. The mask data is data other than the hit data in training data in the current batch, and the hit data is data hit by performing data query on the exchange index list in the current batch. In an example, if exchange index lists that are in the current batch and that are of all the training nodes are the same, index values corresponding to respective hit data of all the training nodes form the exchange index lists.

In specific implementation, any training node may query a dataset corresponding to the training node based on the shuffled list, to obtain a global mask data list (corresponding to the foregoing MaskdataList) corresponding to the shuffled list, and batch division is performed on the global mask data list, to determine exchange data in a current batch.

It should be noted that, the global mask data list is equivalent to being formed by replacing an index value in the shuffled list. Therefore, data sorting in respective global mask data lists of the M training nodes is the same as data sorting in the shuffled global index list, and the respective global mask data lists of the M training nodes complement to each other, to entirely form all data required for model training. Herein, the data required for training may be data in the datasets of the M training nodes, or may be data obtained after data processing is performed on the datasets of the M training nodes.

In some possible cases, batch division is performed on the global mask data list to obtain segments (a continuous sequence in the global mask data list) corresponding to a plurality of batches. The plurality of batches are sequentially used as the current batch, and valid data in a segment corresponding to the batch is used as the hit data. Herein, batch division may be understood as list slicing. If the exchange index lists that are in the current batch and that are of all the training nodes are the same, locations of segments that correspond to the current batch and that are of all the training nodes in the global mask data list are the same.

Herein, since the global dataset has a large data volume, a large amount of computing power is consumed if full query is directly performed without performing mask processing. Therefore, data query is preferably performed after mask processing is performed. The implementation is as follows:

Mask processing is performed on an index value that is in the shuffled list and that is beyond an index range of the dataset corresponding to the training node, to obtain a global index mask list (corresponding to the foregoing MasksIndexList or MaskedsBatchIndexList). Then, data query is performed, based on the global index mask list, on the dataset corresponding to the training node, and an unmasked index value in the global index mask list is replaced with found data, to obtain a global mask data list (corresponding to the foregoing MaskdataList).

It should be noted that the global index mask list is formed by replacing the index value in the shuffled list. Therefore, respective global index mask lists of the M training nodes complement to each other, to entirely form the shuffled list.

In some possible implementations, batch division is performed on the shuffled list to obtain an exchange index list (a continuous sequence in the shuffled list, that is, a segment) in the current batch. If there is no global mask data list, data query is performed, based on the exchange index list, on the dataset corresponding to the training node, to obtain the exchange data. If there is the global mask data list, data that corresponds to the exchange index list and that is in the global mask data list is selected to obtain the exchange data.

In addition, the any training node may further perform batch division on the global index mask list to obtain a node mask index list (a continuous sequence in the global index mask list, that is, a segment) of the global index mask list in the current batch. Herein, the training node mask index list may be understood as a mask list of the foregoing exchange index list. For a valid index value, data in a dataset corresponding to the training node and data obtained after data processing is performed on the data may be found. For an invalid index value, no data is found. Herein, a query result of the invalid index value in the node mask index list is a preset result, and query may alternatively be skipped directly. For example, if the invalid index value is 0, only an index value greater than 0 is queried, so that query efficiency is improved to some extent. If the exchange index lists that are in the current batch and that are of all the training nodes are the same, locations of node mask index lists that correspond to the current batch and that are of all the training nodes in the global mask data list are the same.

In a feasible implementation, if each piece of data in the dataset is independent, and data processing is performed to change data content and/or a data volume, the hit data may be data obtained after data processing is performed, and certainly, may alternatively be data before data processing, to ensure the data reference value. The hit data is not limited in this embodiment of the present invention, and may be specifically determined based on an actual requirement.

In a feasible implementation, if the data in the dataset is related to each other and convergence processing such as data enhancement needs to be performed, correspondingly, the hit data may be data obtained after batch data processing is performed, for example, the foregoing enhanced batch data, and certainly, may alternatively be data before data processing, to ensure the data reference value. The hit data is not limited in this embodiment of the present invention, and may be specifically determined based on an actual requirement.

Step 802: Obtain shared data, and obtain, based on the shared data, training data corresponding to the training node deployed in the training device, where the shared data is obtained by mutually complementing respective hit data of the M training nodes.

In this embodiment of the present invention, a data volume and data content of the hit data of the training node in the exchange data in the current batch are controlled based on the exchange index list of the training node in the current batch. If a data volume of shared data in one batch needs to be ensured, exchange index lists that are in the current batch and that correspond to the exchange data of the M training nodes are the same, and it is ensured that the shared data is data hit by each index value in the exchange index list. If it further needs to be ensured that data volumes of training data in different batches are the same, lengths of exchange index lists in the different batches are the same. Certainly, if some or all of the exchange index lists of all the training nodes in the current batch are different, a final data volume of the shared data cannot be ensured. For details, refer to the foregoing descriptions. Details are not described again.

The shared data (the foregoing global data in the current batch) may manage respective training data of all the training nodes. After the shared data is obtained, the training data of all the training nodes is directly managed based on the shared data without focusing on datasets corresponding to all the training nodes. It should be noted that the shared data of all the training nodes is the same.

In a feasible implementation, if the shared data is used as the training data, all the training nodes separately perform model training based on the shared data.

In another feasible implementation, the shared data is divided based on the quantity M of training nodes, to obtain the respective training data of all the training nodes. Herein, each training node shares the respective training data of all the training nodes. In some possible implementations, when the shared data is represented in a list manner, the exchange data is also represented in a list manner, and the shared data includes hit data and mask data. When the exchange index lists in the current batch are the same, the shared data is a list obtained after the mask data in the exchange data is eliminated. Herein, the training data of all the training nodes may be completely different, or may be partially different. This needs to be specifically determined based on an actual requirement. This is not specifically limited in embodiments of the present invention.

In another feasible implementation, step 802 may be performed by a processor of the training device. After obtaining the training data, the processor sends the training data to a corresponding training node.

When there is only one training device, and n=1, since a processor of the training device establishes a process for each training node, and the process is used to determine to exchange data, data exchange is implemented through inter-process communication, to obtain the training data.

When there are a plurality of training devices, and n is greater than or equal to 2, data exchange is implemented through communication between the plurality of training devices and inter-process communication between the training devices, to obtain the training data.

The processor of the training device may obtain the shared data.

When there is no central training device, or the training device is the central training device, the processor of the training device may receive exchange data sent by other training devices, and then perform convergence, to obtain the shared data. When the training device is the central training device, the shared data further needs to be sent to processors of other training devices.

When there is the central training device, and the training device is not the central training device, the processor of the training device sends, to the central training device, exchange data of a training node deployed in the training device, and receives the shared data sent by the central training device.

In a scenario in which the shared data is used as the training data, the processor of the training device sends the shared data as the training data to each training node deployed in the training device.

In a scenario in which the shared data is divided based on the quantity M of training nodes, the processor of the training device obtains the respective training data of all the training nodes based on the shared data, and sends training data that belongs to the processor of the training device to a corresponding training node.

In an example, step 802 may be performed by the training node deployed in the training device. Herein, data exchange is implemented between the M training nodes through high-speed network communication, to ensure communication efficiency and data processing efficiency.

The training node deployed in the training device may obtain the shared data.

When there is no central training node, or the training device is the central training node, the training node may receive exchange data sent by other training nodes, and then perform convergence, to obtain the shared data. When the training node is the central training device, the shared data further needs to be sent to processors of other training nodes.

When there is the central training node, and the training node is not the central training node, the training node receives exchange data sent by the training device, sends the exchange data to the central training node, and receives the shared data sent by the central training node.

Further, in a scenario in which the shared data is used as the training data, the training node uses the shared data as the training data to perform model training.

In a scenario in which the shared data is divided based on the quantity M of training nodes, the training node obtains the respective training data of all the training nodes based on the shared data, and performs model training based on training data that belongs to the training node.

In another feasible implementation, a processor of the training device may obtain the shared data. A training node deployed in the training device may obtain, based on the shared data, training data of each training node deployed in the training device. For details, refer to the foregoing descriptions. Details are not described again.

Step 803: The training node deployed in the training device performs model training based on the corresponding training data.

Therefore, in this solution, missing data of each training node is complemented through distributed storage and data exchange of the training node. Without increasing extra storage costs, read efficiency can be improved, and it can be ensured that each training node obtains same shared data, and obtains training data of the training node based on the shared data to perform model training, thereby implementing global management of local storage.

The following describes, based on the model training solution described above, another model training method provided in this embodiment of the present invention. It may be understood that the method is another expression manner of the model training solution described above, and the method and the model training solution are combined. The method is proposed based on the model training solution described above. For some or all content of the method, refer to the foregoing descriptions of the model training solution.

FIG. 9 is a schematic flowchart of another model training method according to an embodiment of the present invention. It may be understood that the method may be performed by a first training node. The first training node is any training node in the M training nodes, the M training nodes are deployed in n training devices, each of the n training devices stores a global index list shared by the M training nodes and a dataset corresponding to each training node deployed in the training device, the global index list indicates at least one index of data in a dataset corresponding to the first training node, n is a positive integer greater than or equal to 1, and M is a positive integer greater than or equal to 2. As shown in FIG. 9, the model training method includes the following steps.

Step 901: Receive exchange data sent by a processor of a training device in which the first training node is located, where the exchange data is obtained by the processor by shuffling the global index list by using a random number seed, and perform, based on a shuffled list, data query on the dataset corresponding to the first training node, where the exchange data is hit data obtained through data query.

For detailed content of the exchange data, refer to the foregoing descriptions. Details are not described again.

Herein, the n training devices form the model training system 100.

Step 902: Obtain respective exchange data of other training nodes in the M training nodes, and then perform convergence, to obtain shared data, where the shared data is obtained by mutually complementing respective hit data of the M training nodes.

In a feasible implementation, the first training node sends exchange data of the first training node to each node other than the first training node in the M training nodes, receives exchange data sent by the node other than the first training node in the M training nodes, and converges all exchange data to obtain the shared data.

In a feasible implementation, the first training node, serving as a specified node (that is, the foregoing central training node), receives exchange data sent by each node other than the first training node in the M training nodes, converges all exchange data to obtain the shared data, and sends the shared data to the node other than the first training node in the M training nodes.

In a feasible implementation, the first training node sends exchange data of the first training node to a specified node (that is, the foregoing central training node) other than the first training node in the M training nodes, and the specified node receives the shared data sent by the first training node.

Step 903: Obtain, based on the shared data, training data of the first training node to perform model training.

In a feasible implementation, the training data is the shared data.

In a feasible implementation, the training data of the first training node is training data that belongs to the first training node and that is in respective training data, of the M training nodes, obtained by dividing the shared data.

Further, the first training node obtains the respective training data of the M training nodes based on the shared data, and sends training data other than that of the first training node to a corresponding training node, so that the corresponding training node performs model training based on the training data other than that of the first training node.

Therefore, in this solution, missing data in each batch of each training node is complemented through distributed storage and data exchange of the training node. Without increasing extra storage costs, read efficiency can be improved, and it can be ensured that each training node obtains same shared data, and obtains training data of the training node based on the shared data to perform model training, thereby implementing global management of local storage.

It can be understood that the processor in embodiments of this application may be a central processing unit (central processing unit, CPU), or may be another general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The general-purpose processor may be a microprocessor or any regular processor.

The method steps in embodiments of this application may be implemented in a hardware manner, or may be implemented in a manner of executing software instructions by the processor. The software instructions may include a corresponding software module. The software module may be stored in a random access memory (random access memory, RAM), a flash memory, a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), a register, a hard disk, a removable hard disk, a CD-ROM, or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on a computer, the procedure or functions according to embodiments of the present invention are all or partially generated. The computer may be a general-purpose computer, a dedicated computer, a computer network, or other programmable apparatuses. The computer instructions may be stored in a computer-readable storage medium, or may be transmitted over the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

It may be understood that various numbers in embodiments of this application are merely used for differentiation for ease of description, and are not used to limit the scope of embodiments of this application.

The invention claimed is:

1. A model training system, comprising:

n training devices, in which a total of M training nodes are deployed, wherein each training device stores a global index list and a dataset corresponding to a training node deployed in the training device, the global index list indicates indices of data in datasets respectively corresponding to the M training nodes, n is a positive integer greater than or equal to 1, M is a positive integer greater than or equal to n, and each of the n training devices comprises at least one processor and at least one memory storing instructions that, when executed by the at least one processor, cause the training device to perform operations as a first device, the first device is configured to:

in a current round of a round iteration process, shuffle the global index list by using the random number seed, and perform, based on the shuffled list, data query and batch division on the dataset stored in the first device, to obtain exchange data of the training node deployed in the first device in a current batch of a batch iteration process, wherein batch division is based on a sequence of indexes indicated by the shuffled list, the sequence of the indexes indicates a data sequence, the current batch is any batch in a plurality of batches in the current round, and shuffled lists in a plurality of rounds are different;

generate a global index mask list corresponding to the shuffled list by performing mask processing on index values that are beyond an index range of the dataset stored in the first device;

obtain a global mask data list corresponding to the global index mask list;

determine the exchange data based on the global mask data list; and obtain shared data, and obtain, based on the shared data, training data corresponding to the training node deployed in the training device, wherein the shared data is obtained by mutually complementing respective hit data of the M training nodes, wherein the M training nodes are configured to perform model training based on corresponding training data.

2. The model training system according to claim 1, wherein for any training node in the M training nodes, the training node is configured to: obtain respective exchange data of other training nodes in the M training nodes, to obtain the shared data, and obtain training data of the training node based on the shared data to perform model training.

3. The model training system according to claim 1, wherein the hit data is data hit by performing data query on an exchange index list in the current batch, the exchange index list indicates a data index that is in the current batch and that is obtained by performing batch division on the shuffled list, and respective exchange index lists that are in the current batch and that are of the M training nodes are the same; and the shared data is data obtained by eliminating data that is not hit in the exchange index list and that is of the training node deployed in the first device.

4. The model training system according to claim 1, wherein the first device is further configured to: perform batch division based on the global mask data list, to determine the exchange data of the training node deployed in the first device in the current batch.

5. The model training system according to claim 4, wherein the first device is further configured to: perform, based on the global index mask list, a data query on the dataset stored in the first device, to obtain the global mask data list corresponding to the global index mask list.

6. The model training system according to claim 1, wherein the global index list comprises at least one batch index value corresponding to each of the M training nodes, and the batch index value indicates enhanced batch data that is in one batch and that is in the dataset corresponding to the training node;

the first device is further configured to perform, in a unit of batch, data enhancement on the dataset stored in the first device, to obtain enhanced batch data of each of at least one batch index value corresponding to the training node deployed in the first device; and the current batch corresponds to a target index value, and the target index value is any one or more of the at least one batch index value; and the hit data is enhanced batch data corresponding to the target index value.

7. The model training system according to claim 6, wherein there are a plurality of batch index values corresponding to the training node deployed in the first device, and a local data index list of the dataset corresponding to the training node deployed in the first device is stored; and the first device is further configured to: shuffle the local data index list stored in the first device and divide a shuffled list, to determine respective data index lists of the plurality of batch index values corresponding to the training node deployed in the first device; and for any batch index value in the plurality of batch index values, perform, based on a data index list of the batch index value, data query on the dataset stored in the first device, and perform data enhancement on found data, to obtain the enhanced batch data.

8. A model training method, applied to a training device, wherein the training device is any training device in n training devices, a total of M training nodes are deployed in the n training devices, the training device stores a global index list and a dataset corresponding to a training node deployed in the training device, the global index list indicates at least an index of data in the dataset corresponding to the deployed training node, n is a positive integer greater than or equal to 1, and M is a positive integer greater than or equal to n; and the method includes:

in a current round in a round iteration process, shuffling the global index list by using the random number seed, and performing, based on the shuffled list, data query and batch division on the dataset stored in the training device, to obtain exchange data of the training node deployed in the training device in a current batch in a batch iteration process, wherein batch division is based on a sequence of indexes indicated by the shuffled list, the sequence of the indexes indicates a data sequence, the current batch is any batch in a plurality of batches in the current round, shuffled lists in a plurality of rounds are different, and the exchange data is hit data obtained through data query;

generating, by the at least one processor, a global index mask list corresponding to the shuffled list by performing mask processing on index values that are beyond an index range of the dataset stored in the training device;

obtaining, by the at least one processor, a global mask data list corresponding to the global index mask list;

determining, by the at least one processor, the exchange data based on the global mask data list; obtaining, by the at least one processor, shared data, and obtaining, by the at least one processor, training data corresponding to the training node deployed in the training device based on the shared data, wherein the shared data is obtained by mutually complementing respective hit data of the M training nodes; and performing, by the training node deployed in the training device, model training based on the corresponding training data.

9. The method according to claim 8, wherein the obtaining shared data, and obtaining, based on the shared data, training data corresponding to the training node deployed in the training device comprises:

obtaining, by the training node deployed in the training device, exchange data of other training nodes in the M training nodes, and then performing convergence, to obtain the shared data; and obtaining the training data of the training node based on the shared data.

10. The method according to claim 8, wherein the hit data is data hit by performing data query on an exchange index list in the current batch, the exchange index list indicates a data index that is in the current batch and that is obtained by performing batch division on the shuffled list, and respective exchange index lists that are in the current batch and that are of the M training nodes are the same; and the shared data is data obtained by eliminating data that is not hit in the exchange index list and that is of the training node deployed in the training device.

11. The method according to claim 8, wherein the shuffling the global index list by using the random number seed, and performing, based on the shuffled list, data query and batch division on the dataset stored in the training device, to obtain exchange data of the training node deployed in the training device in a current batch in a batch iteration process comprises:

performing batch division based on the global mask data list, to determine the exchange data in the current batch.

12. The method according to claim 11, wherein the generating, by the at least one processor of the training device, a global mask data list corresponding to the shuffled list comprises:

performing, by the at least one processor, data query on the dataset stored in the training device based on the global index mask list, to obtain the global mask data list corresponding to the global index mask list.

13. The method according to claim 8, wherein the global index list comprises at least one batch index value corresponding to the training node deployed in the training device, and the batch index value indicates enhanced batch data that is in one batch and that is in the dataset stored in the training device;

the current batch corresponds to a target index value, and the target index value is any one or more of the at least one batch index value;

the hit data is enhanced batch data corresponding to the target index value; and the method further comprises:

performing, in a unit of batch, data enhancement on the dataset stored in the training device, to obtain enhanced batch data of each of the at least one batch index value corresponding to the training node deployed in the training device.

14. The method according to claim 13, wherein there are a plurality of batch index values of the training node, and the training device stores a local data index list of the dataset corresponding to the deployed training node; and the method further comprises:

shuffling the local data index list stored in the training device and dividing a shuffled list, to determine respective data index lists of the plurality of batch index values of the training node deployed in the training device; and for any index value in the plurality of batch index values, performing, based on a data index list of the batch index value, data query on the dataset stored in the training device, and performing data enhancement on found data, to obtain the enhanced batch data.

15. A model training method, applied to a first training node, wherein the first training node is any one of M training nodes, the M training nodes are deployed in n training devices, each of the n training devices stores a global index list and a dataset corresponding to a training node deployed in the training device, the global index list indicates at least an index of data in a dataset corresponding to the first training node, n is a positive integer greater than or equal to 1, and M is a positive integer greater than or equal to n; and the method includes:

in a current round of a round iteration process, shuffling, by at least one processor of a training device in which the first training node is deployed, the global index list by using a random number seed, and performing, by the at least one processor and based on a shuffled list, data query and batch division on the dataset corresponding to the first training node, to obtain exchange data of the first training node in a current batch of a batch iteration process, wherein the exchange data is hit data obtained through data query, batch division is based on a sequence of indexes indicated by the shuffled list, the sequence of the indexes indicates a data sequence, the current batch is any batch in a plurality of batches in the current round, and shuffled lists in a plurality of rounds are different;

generating, by the at least one processor, a global index mask list corresponding to the shuffled list by performing mask processing on index values that are beyond an index range of the dataset stored in the training device in which the first training node is deployed;

obtaining, by the at least one processor, a global mask data list corresponding to the global index mask list;

determining, by the at least one processor, the exchange data based on the global mask data list; obtaining, by the at least one processor, respective exchange data of other training nodes in the M training nodes, and then performing convergence by the at least one processor, to obtain shared data, wherein the shared data is obtained by mutually complementing respective hit data of the M training nodes; and obtaining, by the at least one processor, training data of the first training node based on the shared data to perform model training.

16. The method according to claim 15, wherein the exchange data is data that is in a current batch and that belongs to the first training node in a next-batch iteration process in one round.

17. The method according to claim 16, wherein the hit data is data hit by performing data query on an exchange index list in the current batch, the exchange index list indicates a data index that is in the current batch and that is obtained by performing batch division on the shuffled list, and respective exchange index lists that are in the current batch and that are of the M training nodes are the same; and the shared data is data obtained by eliminating data that is not hit in the exchange index list.

18. The method according to claim 16, wherein the global index list comprises at least one batch index value corresponding to the first training node, the batch index value indicates enhanced batch data that is in one batch and that is in the dataset, and the enhanced batch data is obtained by the processor by performing, in a unit of batch, data enhancement on the dataset corresponding to the first training node;

the current batch corresponds to a target index value, and the target index value is any one or more of the at least one batch index value; and the hit data is enhanced batch data corresponding to the target index value.

* * * * *